United States Patent
Conway et al.

(10) Patent No.: US 12,522,421 B2
(45) Date of Patent: Jan. 13, 2026

(54) METHOD AND SYSTEM FOR STORING AND/OR TRANSPORTING TEMPERATURE-SENSITIVE MATERIALS

(71) Applicant: Cold Chain Technologies, LLC, Franklin, MA (US)

(72) Inventors: Heather M. Conway, Franklin, MA (US); Dawn E. Smith, Hopkinton, MA (US); Geoffrey Kaiser, Westborough, MA (US)

(73) Assignee: COLD CHAIN TECHNOLOGIES, LLC, Franklin, MA (US)

( * ) Notice: Subject to any disclaimer, the term of this patent is extended or adjusted under 35 U.S.C. 154(b) by 131 days.

(21) Appl. No.: 17/891,631

(22) Filed: Aug. 19, 2022

(65) Prior Publication Data

US 2023/0064825 A1 Mar. 2, 2023

Related U.S. Application Data

(60) Provisional application No. 63/317,261, filed on Mar. 7, 2022, provisional application No. 63/235,006, filed on Aug. 19, 2021.

(51) Int. Cl.
 *B65D 81/38* (2006.01)
 *B65D 65/38* (2006.01)
 *F25D 3/08* (2006.01)

(52) U.S. Cl.
 CPC ......... *B65D 81/3858* (2013.01); *B65D 65/38* (2013.01); *F25D 3/08* (2013.01); *B65D 2565/385* (2013.01)

(58) Field of Classification Search
 CPC ................ B65D 81/3858; B65D 65/38; B65D 2565/385; F25D 3/08; F25D 2303/0843;
 (Continued)

(56) References Cited

U.S. PATENT DOCUMENTS 1,979,245 A * 11/1934 Andrews .............. B65D 5/2033
  229/162.1
3,420,363 A * 1/1969 Blickensderfer .. B65D 81/1275
  264/230

(Continued)

FOREIGN PATENT DOCUMENTS

WO  2018213348 A2  11/2018

OTHER PUBLICATIONS

Ranpak Ready Roll protective paper cushioning wrap, Ranpak Corp., Concord Township, OH; https://www.ranpak.com/products/ready-roll/?gclid=CjwKCAjwo4mlBhBsEiwAKgzXOHL8E96GMxFTNZMWNISk6_Xr90_M2YTmlssgzBqa3VAMJnJNLFFNjhoCnlwQAvD_BwE, accessed May 27, 2024.

(Continued)

*Primary Examiner* — Shawn M Braden
(74) *Attorney, Agent, or Firm* — KRIEGSMAN & KRIEGSMAN

(57) ABSTRACT

Method and system for maintaining temperature-sensitive materials within a desired temperature range for an extended time. In one embodiment, the system includes an outer box having a rectangular cavity. An insulation unit is snugly but removably positioned in the rectangular cavity. The insulation unit includes a support and a thermal insulation member. The support may be a generally rectangular sleeve with four sides, an open bottom and an open top. The thermal insulation may be a bilayer material wrapped around the four sides of the support to form a spiral structure. The bilayer material may include a first sheet of an expanded slit-sheet packaging material and a second sheet of tissue paper. The system may additionally include a bottom insulation member at the bottom of the support, a top insulation member at the top of the support, and a payload and (Continued)

temperature-control members between the top and bottom insulation member.

31 Claims, 23 Drawing Sheets

(58) Field of Classification Search
CPC ..... F25D 2303/0844; F25D 2303/0845; F25D 2331/804; F25D 2303/081; F25D 2303/083; F25D 2303/084
See application file for complete search history.

(56) References Cited

U.S. PATENT DOCUMENTS

| | | | |
|---|---|---|---|
| 4,438,849 A * | 3/1984 | Stone | B65D 5/5035 |
| | | | 220/694.1 |
| 4,862,674 A * | 9/1989 | Lejondahl | B65D 81/386 |
| | | | 53/399 |
| 5,644,578 A * | 7/1997 | Ohsawa | G11C 29/44 |
| | | | 714/719 |
| 5,667,871 A * | 9/1997 | Goodrich | B31C 5/00 |
| | | | 428/338 |
| 5,688,578 A | 11/1997 | Goodrich et al. | |
| 5,899,088 A | 5/1999 | Purdum | |
| 5,924,302 A | 7/1999 | Derifield | |
| 6,116,042 A | 9/2000 | Purdum | |
| 6,482,332 B1 | 11/2002 | Malach | |
| 6,868,982 B2 * | 3/2005 | Gordon | B65D 81/3823 |
| | | | 220/592.25 |
| 6,875,486 B2 | 4/2005 | Miller | |
| 7,257,963 B2 | 8/2007 | Mayer | |
| 7,849,708 B2 | 12/2010 | Goncharko et al. | |
| 8,074,465 B2 | 12/2011 | Heroux et al. | |
| 8,250,882 B2 | 8/2012 | Mustafa et al. | |
| 8,607,581 B2 | 12/2013 | Williams et al. | |
| 8,613,202 B2 | 12/2013 | Williams | |
| 8,763,811 B2 | 7/2014 | Lantz | |
| 8,887,515 B2 | 11/2014 | Patstone | |
| 8,938,986 B2 | 1/2015 | Matta et al. | |
| 9,045,278 B2 | 6/2015 | Mustafa et al. | |
| 9,139,319 B2 | 9/2015 | Crespo et al. | |
| 9,180,998 B2 | 11/2015 | Banks et al. | |
| 9,366,469 B2 | 6/2016 | Chapman, Jr. | |
| 9,429,350 B2 | 8/2016 | Chapman, Jr. | |
| D770,282 S | 11/2016 | Ye et al. | |
| D775,956 S | 1/2017 | Ye et al. | |
| 9,550,618 B1 | 1/2017 | Jobe | |
| 9,689,602 B2 | 6/2017 | Emond et al. | |
| 9,944,449 B2 | 4/2018 | Wood et al. | |
| 9,981,797 B2 | 5/2018 | Aksan et al. | |
| 10,077,389 B2 | 9/2018 | Formato et al. | |
| 10,099,836 B2 | 10/2018 | Cheich | |
| 10,309,709 B2 | 6/2019 | Emond et al. | |
| 10,766,685 B2 | 9/2020 | Kuhn et al. | |
| 10,829,675 B2 | 11/2020 | Formato et al. | |
| 11,059,256 B2 | 7/2021 | Cheich et al. | |
| 11,254,485 B2 | 2/2022 | Tattam | |
| 2011/0290792 A1 | 12/2011 | Krzak et al. | |
| 2016/0067938 A1 | 3/2016 | Goodrich | |
| 2016/0362240 A1 | 12/2016 | Ferracamo, Jr. | |
| 2017/0121097 A1 | 5/2017 | Pranadi et al. | |
| 2018/0093816 A1 | 4/2018 | Longley et al. | |
| 2018/0100682 A1 | 4/2018 | Nilsen et al. | |
| 2018/0320947 A1 | 11/2018 | Jain et al. | |
| 2018/0328644 A1 | 11/2018 | Rizzo et al. | |
| 2019/0210790 A1 | 7/2019 | Rizzo et al. | |
| 2020/0002075 A1 | 1/2020 | Lee et al. | |
| 2020/0231362 A1 | 7/2020 | Kulangara et al. | |
| 2020/0247079 A1 | 8/2020 | Goodrich | |
| 2020/0262637 A1 * | 8/2020 | Tattam | B65D 5/12 |
| 2020/0408453 A1 | 12/2020 | Martino | |
| 2021/0024270 A1 | 1/2021 | Mirzaee Kakhki | |
| 2023/0339669 A1 | 10/2023 | Blezard et al. | |

OTHER PUBLICATIONS

PaperEZ WrapBox Honeycomb Paper Dispenser, Ameson (USA) Packaging Inc., Dallas, TX; https://www.cushionpak.com/honeycomb-paper-dispenser/, accessed May 27, 2024.

ButcherBox packaged meats, ButcherBox OpCo LLC, Watertown, MA; https://www.butcherbox.com/how-it-works, accessed May 27, 2024.

HexcelPack paper, HexcelPack, LLC, Sedona, AZ; https://www.hexcelpack.com/, accessed May 27, 2024.

Fastpack Packaging honeycomb die-cut Kraft paper expander and tissue paper dispenser, Fastpack Packaging Inc., Lee, FL; https://www.fastpack.net/honeycomb-die-cut-kraft-paper-expander-and-tissue-paper-dispenser-double-roll/, accessed May 27, 2024.

Technical Note, "Recyclable Paper Cooler," ThermoFisher Scientific Inc., Waltham, MA (2018).

Uline cellulose wadding, Uline, Pleasant Prairie, WI; https://www.uline.com/BL_1905/Uline-Cellulose-Wadding, accessed May 27, 2024.

Hexcel'ope envelope, HexcelPack, LLC, Sedona, AZ; https://www.hexcelpack.com/packing-solutions/the-hexcelope/, accessed May 27, 2024.

Curby Mailer envelope, Intertape Polymer Group, Sarasota, FL; https://www.itape.com/product/curby-mailer/; accessed May 27, 2024.

* cited by examiner

METHOD AND SYSTEM FOR STORING AND/OR TRANSPORTING TEMPERATURE-SENSITIVE MATERIALS

CROSS-REFERENCE TO RELATED APPLICATIONS

The present application claims the benefit under 35 U.S.C. 119(e) of U.S. Provisional Patent Application No. 63/235,006, inventors Heather M. Conway et al., filed Aug. 19, 2021, and U.S. Provisional Patent Application No. 63/317,261, inventors Heather M. Conway et al., filed Mar. 7, 2022, the disclosures of both of which are incorporated herein by reference in their entireties.

BACKGROUND OF THE INVENTION

The present invention relates generally to methods and systems for maintaining temperature-sensitive materials within a desired temperature range for a period of time and relates more particularly to a novel method and system for maintaining temperature-sensitive materials within a desired temperature range for a period of time.

There is a continuing need for systems that can maintain temperature-sensitive materials within a desired temperature range for an extended period of time. For example, many pharmaceuticals, biological materials, medical devices, foods, beverages, and other temperature-sensitive materials must be maintained within a particular temperature range (such as, for example, −90° C. to −60° C.; −25° C. to −15° C.; +2° C. to +8° C.; +15° C. to +25° C.) in order to prevent the spoilage of such materials. As can readily be appreciated, the maintenance of such materials within a desired temperature range while such materials are being transported and/or stored can be challenging. One way in which such temperature maintenance may be achieved is by transporting and/or storing such materials in active temperature-control devices, such as electrically-powered refrigeration units or the like. However, as can be appreciated, such active temperature-control devices add considerable expense to transportation and/or storage costs.

An alternative approach to temperature maintenance during transportation and/or storage is to use a passive temperature-control device, such as a thermally insulated container that may contain one or more passive temperature-control members, such as, but not limited to, ice packs, gel packs, dry ice, wet ice, or the like. As can readily be appreciated, the efficacy of such an approach depends, in part, on the thermally insulating quality of the thermally insulated container. The thermally insulating quality of the thermally insulated container, in turn, depends, in part, on the type of insulating material of which the container is made, with some thermal insulating materials exhibiting superior thermal insulating properties as compared to other thermal insulating materials. For example, some thermal insulating materials, such as vacuum insulated panels (VIP), tend to have comparatively greater thermal insulating properties (i.e., comparatively high "R-values") whereas other materials, such as expanded polystyrene (EPS) and expanded polypropylene (EPP), tend to have comparatively lesser thermal insulating properties (i.e., comparatively low "R-values"), and still other materials, such as polyurethane foam, tend to have thermal insulating properties that are intermediate to those of VIP and EPS/EPP (i.e., comparatively intermediate "R-values").

These various types of insulating materials tend to have their own pros and cons. For example, materials with higher R-values, such as vacuum insulated panels, tend to be more expensive than materials with lower R-values, such as expanded polystyrene. Moreover, vacuum insulated panels tend to be very fragile and can easily lose their R-value if they are punctured or otherwise become damaged.

In addition, irrespective of the type of insulating material used, insulated containers made by assembling a plurality of insulation panels to form a box-like structure tend to possess small air gaps along the seams where adjacent panels are brought together. Such air gaps are undesirable as they create thermal leakages that reduce the amount of time that the insulated container can maintain a payload within a desired temperature.

Moreover, in the case of many insulated containers, it is impractical or impossible for the insulated container to be fabricated at its point of use. Consequently, in many cases, the insulated container must be fabricated at a first location and then shipped in its fabricated state to a second location for subsequent deployment. This may be undesirable, however, as the fabricated insulated container may be space-consuming, and its shipping and/or storage may not be cost-effective.

Furthermore, in the case of many insulated containers, the type of insulating material that is used may not be environmentally friendly from a manufacturing and/or disposal standpoint. For example, materials like expanded polystyrene and polyurethane foam are generally not regarded as being recyclable.

Documents that may be of interest may include the following, all of which are incorporated herein by reference: U.S. Pat. No. 10,766,685 B2, inventors Kuhn et al., which issued Sep. 8, 2020; U.S. Pat. No. 10,309,709 B2, inventors Emond et al., which issued Jun. 4, 2019; U.S. Pat. No. 9,981,797 B2, inventors Aksan et al., which issued May 29, 2018; U.S. Pat. No. 9,944,449 B2, inventors Wood et al., which issued Apr. 17, 2018; U.S. Pat. No. 9,689,602 B2, inventors Emond et al., which issued Jun. 27, 2017; U.S. Pat. No. 9,550,618 B1, inventor Jobe, which issued Jan. 24, 2017; U.S. Pat. No. 9,429,350 B2, inventor Chapman, Jr., which issued Aug. 30, 2016; U.S. Pat. No. 9,366,469 B2, inventor Chapman, Jr., which issued Jun. 14, 2016; U.S. Pat. No. 9,180,998 B2, inventors Banks et al., which issued Nov. 10, 2015; U.S. Pat. No. 9,139,319 B2, inventors Crespo et al., which issued Sep. 22, 2015; U.S. Pat. No. 9,045,278 B2, inventors Mustafa et al., which issued Jun. 2, 2015; U.S. Pat. No. 8,938,986 B2, inventors Matta et al., which issued Jan. 27, 2015; U.S. Pat. No. 8,887,515 B2, inventor Patstone, which issued Nov. 18, 2014; U.S. Patent No. 8,763,811, inventor Lantz, which issued Jul. 1, 2014; U.S. Pat. No. 8,613,202 B2, inventor Williams, which issued Dec. 24, 2013; U.S. Pat. No. 8,607,581 B2, inventors Williams et al., which issued Dec. 17, 2013; U.S. Pat. No. 8,250,882 B2, inventors Mustafa et al., which issued Aug. 28, 2012; U.S. Pat. No. 8,074,465 B2, inventors Heroux et al., which issued Dec. 13, 2011; U.S. Pat. No. 7,849,708 B2, inventor Goncharko et al., which issued Dec. 14, 2010; U.S. Pat. No. 7,257,963 B2, inventor Mayer, which issued Aug. 21, 2007; U.S. Pat. No. 6,875,486 B2, inventor Miller, which issued Apr. 5, 2005; U.S. Pat. No. 6,868,982 B2, inventor Gordon, which issued Mar. 22, 2005; U.S. Pat. No. 6,482,332 B1, inventor Malach, which issued Nov. 19, 2002; U.S. Pat. No. 6,116,042, inventor Purdum, which issued Sep. 12, 2000; U.S. Pat. No. 5,924,302, inventor Derifield, which issued Jul. 20, 1999; U.S. Pat. No. 5,899,088, inventor Purdum, which issued May 4, 1999; U.S. Patent Application Publication No. US 2021/0024270 A1, inventor Mirzaee Kakhki, which published Jan. 28, 2021; U.S. Patent Application Publication No. US 2020/0408453 A1, inventor Martino, which published Dec. 31, 2020; U.S. Patent Application Publication No. 2020/0231362 A1, inventors Kulangara et al., which published Jul. 23, 2020; U.S. Patent Application Publication No. US 2020/0002075, inventors Lee et al., which published Jan. 2, 2020; U.S. Patent Application Publication No. 2019/0210790 A1, inventors Rizzo et al., which published Jul. 11, 2019; U.S. Patent Application No. US 2018/0328644 A1, inventors Rizzo et al., which published Nov. 15, 2018; U.S. Patent Application Publication No. US 2018/0320947 A1, inventors Jain et al., which published Nov. 8, 2018; U.S. Patent Application Publication No. US 2018/0100682 A1, inventors Nilsen et al., which published Apr. 12, 2018; U.S. Patent Application Publication No. US 2018/0093816 A1, inventors Longley et al., which published Apr. 5, 2018; U.S. Patent Application Publication No. US 2017/0121097 A1, inventors Pranadi et al., which published May 4, 2017; U.S. Patent Application Publication No. US 2016/0362240 A1, inventors Ferracamo, Jr., which published Dec. 15, 2016; U.S. Patent Application Publication No. US 2011/0290792 A1, inventors Krzak et al., which published Dec. 1, 2011; and PCT International Publication No. WO 2018/213348 A2, which published Nov. 22, 2018.

SUMMARY OF THE INVENTION

It is an object of the present invention to provide a novel shipping system for maintaining temperature-sensitive materials within a desired temperature range for a period of time.

It is another object of the present invention to provide a shipping system as described above that addresses at least some of the shortcomings associated with existing shipping systems.

It is still another object of the present invention to provide a shipping system as described above that has a minimal number of parts, that is relatively inexpensive to manufacture, and that is easy to use.

Therefore, according to one aspect of the invention, there is provided a system for storing and/or transporting temperature-sensitive materials, the system comprising (a) an outer container, the outer container comprising a cavity; (b) an insulation unit disposed in the cavity of the outer container, wherein the insulation unit comprises thermal insulation wrapped around a space at least two times, the space being dimensioned to receive a payload and a passive temperature-control member, the thermal insulation comprising an expanded slit-sheet packaging material; and (c) at least one passive temperature-control member positioned in the space.

In a more detailed feature of the invention, the thermal insulation may be wrapped continuously around the space at least two times to form a plurality of spiral wraps.

In a more detailed feature of the invention, the thermal insulation may be wrapped continuously around the space at least three times, and the thermal insulation may have a conductivity change over the first three spiral wraps of no more than about 0.00057 W/mK per mm.

In a more detailed feature of the invention, the thermal insulation may be wrapped continuously around the space at least three times to form a plurality of spiral wraps, and the thermal insulation may have a layer factor of no more than 7.

In a more detailed feature of the invention, the thermal insulation may comprise a bilayer material, the bilayer material may comprise a first sheet that may be textured and a second sheet that may be non-textured, and the first sheet may be the expanded slit-sheet packaging material.

In a more detailed feature of the invention, the first sheet may comprise an expanded sheet of honeycombed Kraft paper, and the second sheet may comprise tissue paper.

In a more detailed feature of the invention, the first sheet and the second sheet of each spiral wrap may be adhered to one another.

In a more detailed feature of the invention, each spiral wrap may be adhered to an adjacent spiral wrap.

In a more detailed feature of the invention, the thermal insulation may have a thickness of at least 1 inch.

In a more detailed feature of the invention, the thermal insulation may have a thickness of about 1-5 inches.

In a more detailed feature of the invention, the thermal insulation may have a thickness of about 2-4 inches.

In a more detailed feature of the invention, the thermal insulation may have a thickness of about 2-3 inches.

In a more detailed feature of the invention, the thermal insulation may be wrapped around the space about 10-15 times.

In a more detailed feature of the invention, the insulation unit may further comprise a support, the thermal insulation may be wrapped around the support, and the support may define a cavity dimensioned to receive the payload and the at least one passive temperature-control member.

In a more detailed feature of the invention, the support may be shaped to include a plurality of sides, an open top, and an open bottom, and the thermal insulation may be wrapped around the plurality of sides.

In a more detailed feature of the invention, the support may be shaped to include a plurality of sides and a bottom, and the thermal insulation may be wrapped around the plurality of sides.

In a more detailed feature of the invention, the support may be shaped to include a plurality of sides, a closable bottom, and a closable top, and the thermal insulation may be wrapped around the plurality of sides.

In a more detailed feature of the invention, the cavity of the support may be rectangular in transverse cross-section.

In a more detailed feature of the invention, the cavity of the support may be square in transverse cross section.

In a more detailed feature of the invention, the insulation unit, as a whole, may be reversibly transformable between an expanded configuration and a collapsed configuration.

In a more detailed feature of the invention, the outer container and the insulation unit may be reversibly transformable together between an expanded configuration and a collapsed configuration.

In a more detailed feature of the invention, the insulation unit may be recyclable without requiring disassembly.

In a more detailed feature of the invention, a first end of the thermal insulation may be secured to the support.

In a more detailed feature of the invention, the first end of the thermal insulation may be secured to the support with an adhesive.

In a more detailed feature of the invention, the first end of the thermal insulation may be secured to the support mechanically.

In a more detailed feature of the invention, the at least one passive temperature-control member may comprise a saddlebag, the saddlebag may be arranged to define a cavity dimensioned to receive the payload, and the thermal insulation may be wrapped around the saddlebag.

In a more detailed feature of the invention, the saddlebag may be reversibly transformable between an expanded configuration and a collapsed configuration.

In a more detailed feature of the invention, the at least one passive temperature-control member may comprise at least one passive temperature-control member positioned between the payload and the insulation unit.

In a more detailed feature of the invention, the at least one passive temperature-control member may comprise at least one passive temperature-control member positioned above or below the payload.

In a more detailed feature of the invention, the at least one passive temperature-control member may comprise at least one passive temperature-control member positioned between the payload and the insulation unit and at least one passive temperature-control member positioned above or below the payload.

In a more detailed feature of the invention, the system may further comprise at least one of a top insulation member positioned above the payload and a bottom insulation member positioned below the payload.

In a more detailed feature of the invention, at least one of the top insulation member and the bottom insulation member may comprise a bilayer material wrapped around itself, the bilayer material may comprise a first sheet and a second sheet, the first sheet may comprise an expanded slit-sheet packaging material, and the second sheet may comprise tissue paper.

In a more detailed feature of the invention, the outer container may comprise a box.

In a more detailed feature of the invention, the box may be a corrugated cardboard box.

In a more detailed feature of the invention, the outer container may comprise an envelope.

In a more detailed feature of the invention, the insulation unit may further comprise a support, the thermal insulation may be wrapped around the support and adhered to an interior of the envelope, and the support may define a cavity dimensioned to receive the payload and the at least one passive temperature-control member.

In a more detailed feature of the invention, the insulation unit may snugly fit against an interior of the outer container.

According to another aspect of the invention, there is provided an insulation unit for use in a system for storing and/or transporting temperature-sensitive materials, the insulation unit comprising (a) a support, the support defining a cavity dimensioned to receive a payload; and (b) thermal insulation wrapped at least two times in a spiral configuration around the support, wherein the thermal insulation comprises a sheet of an expanded slit-sheet packaging material.

In a more detailed feature of the invention, the support may be a sleeve comprising open top and bottom ends.

In a more detailed feature of the invention, the support may be a 5-sided box comprising four sides, a bottom, and an open top.

In a more detailed feature of the invention, the support may be a 6-sided box comprising four sides, a bottom, and a top.

In a more detailed feature of the invention, the thermal insulation may have a thickness of at least 1 inch.

In a more detailed feature of the invention, the thermal insulation may be wrapped around the support about 10-15 times.

In a more detailed feature of the invention, the support and the thermal insulation together may be reversibly transformable between an expanded configuration and a collapsed configuration.

In a more detailed feature of the invention, the insulation unit may be recyclable without requiring disassembly.

In a more detailed feature of the invention, the thermal insulation may comprise a bilayer material, the bilayer material may comprise a first sheet and a second sheet, the first sheet may be the expanded slit-sheet packaging material, and the second sheet may be a sheet of tissue paper.

According to yet another aspect of the invention, there is provided a method of making an insulation unit, the method comprising the steps of (a) providing a support; and (b) wrapping thermal insulation at least two times in a spiral configuration around an exterior of the support, wherein the thermal insulation comprises a sheet of an expanded slit-sheet packaging material.

In a more detailed feature of the invention, the support may be transformable between an expanded configuration and a collapsed configuration, the wrapping step may comprise wrapping the thermal insulation around the support while the support is in the collapsed configuration, and the method may further comprise, after the wrapping step, expanding the support, with the thermal insulation wrapped around the support, from the collapsed configuration to the expanded configuration.

In a more detailed feature of the invention, the support may be a sleeve comprising open top and bottom ends.

In a more detailed feature of the invention, the support may be a 5-sided box comprising four sides, a bottom, and an open top.

In a more detailed feature of the invention, the support may be a 6-sided box comprising four sides, a bottom, and a top.

In a more detailed feature of the invention, the thermal insulation may have a thickness of at least 1 inch.

In a more detailed feature of the invention, the thermal insulation may be wrapped around the support about 10-15 times.

In a more detailed feature of the invention, the support and the thermal insulation may be recyclable as a unit.

In a more detailed feature of the invention, the thermal insulation may comprise a bilayer material, the bilayer material may comprise a first sheet and a second sheet, the first sheet may be the expanded slit-sheet packaging material, and the second sheet may be a sheet of tissue paper.

In a more detailed feature of the invention, the support may comprise a saddlebag of phase change material.

In a more detailed feature of the invention, the method may further comprise, after the wrapping step, removing the thermal insulation from the support.

For purposes of the present specification and claims, various relational terms like "top," "bottom," "proximal," "distal," "upper," "lower," "front," and "rear" may be used to describe the present invention when said invention is positioned in or viewed from a given orientation. It is to be understood that, by altering the orientation of the invention, certain relational terms may need to be adjusted accordingly.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication. In the drawings wherein like reference numerals represent like parts.

DETAILED DESCRIPTION OF THE INVENTION

The present invention is directed at a novel method and system for maintaining temperature-sensitive materials within a desired temperature range for a period of time. In particular, the present invention is based, at least in part, on the discovery of a novel type of thermally insulating structure for use in such a system. More specifically, in one embodiment, the thermally insulating structure may comprise (i) a support (or liner) adapted to surround a payload cavity; and (ii) a thermally insulating material wrapped around the support a plurality of times, for example, continuously in a spiral manner, the wrapped material preferably being a textured (i.e., structured, non-smooth) sheet material comprising an expanded slit-sheet packaging material. In another embodiment, the support may be omitted from the foregoing thermally insulating structure. In still another embodiment, the aforementioned expanded slit-sheet packaging material, or a bilayer material comprising the aforementioned expanded slit-sheet packaging material and a non-textured sheet, may be used to form a panel of thermal insulation. This may be done, for example, by stacking a plurality of pieces of the expanded slit-sheet packaging material, or bilayer material, and then keeping the stack together in some fashion or by wrapping the expanded slit-sheet packaging material, or bilayer material, around itself and then keeping the wrapped material together in some fashion.

Figure 1:
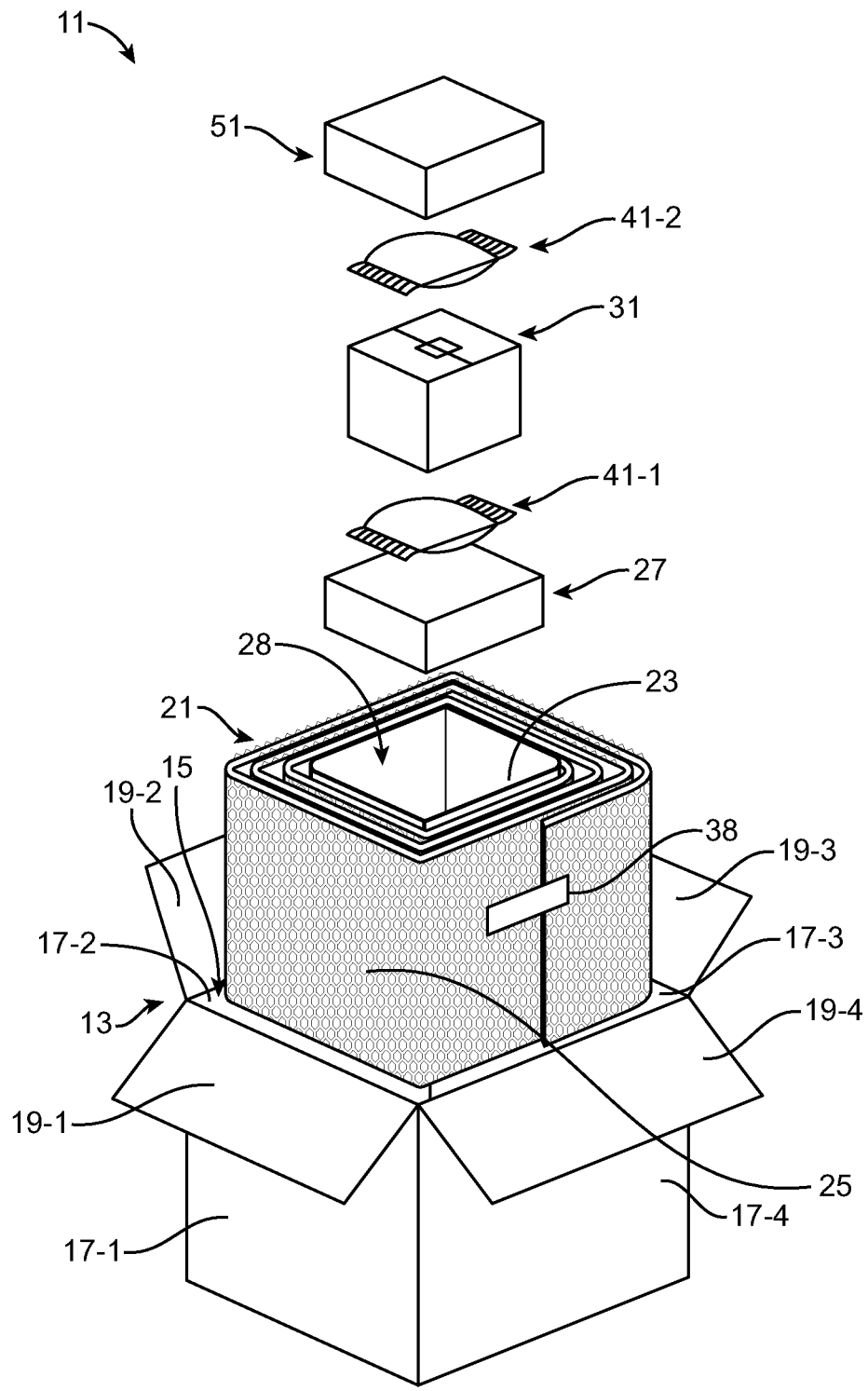
FIG. 1 is a simplified perspective view of a first embodiment of a shipping system constructed according to the present invention for maintaining temperature-sensitive materials within a desired temperature range for a period of time.

Referring now to FIG. 1, there is shown a simplified perspective view of a first embodiment of a shipping system for maintaining temperature-sensitive materials within a desired temperature range for a period of time, the shipping system being constructed according to the present invention and being represented generally by reference numeral 11. (For simplicity and clarity, certain components of shipping system 11 that are not critical to the understanding of the present invention are either not shown or described herein or are shown and/or described herein in a simplified manner.)

Shipping system 11 may comprise an outer box 13. Outer box 13, which may be, for example, a conventional corrugated cardboard box or carton, may comprise a rectangular prismatic cavity 15 bounded by a plurality of rectangular side walls 17-1 through 17-4, a plurality of bottom closure flaps (not shown), and a plurality of top closure flaps 19-1 through 19-4. Adhesive strips of tape or other closure means (not shown) may be used to retain, in a closed condition, the bottom closure flaps and/or the top closure flaps 19-1 through 19-4.

Figure 2A:
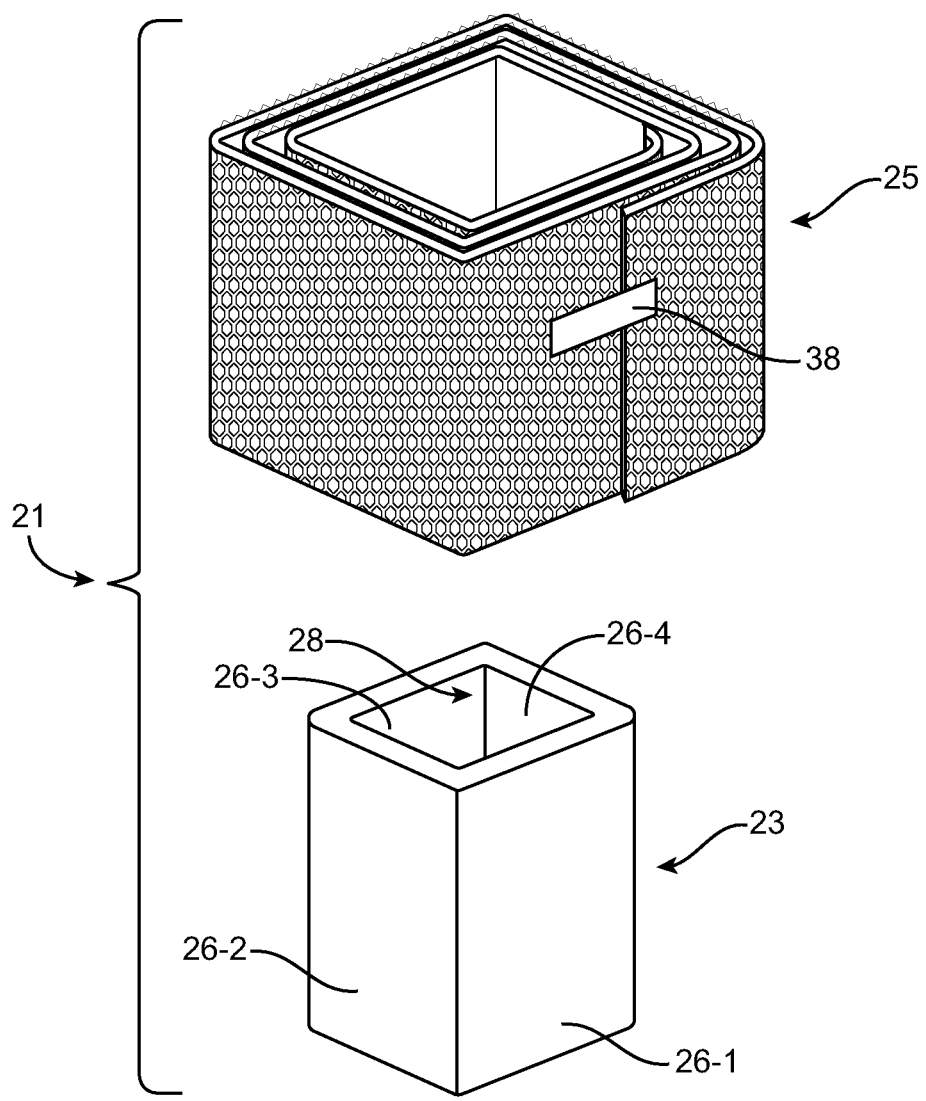
FIGS. 2A and 2B are simplified exploded perspective and simplified top views, respectively, of the insulation unit shown in FIG. 1.
Figure 2B:
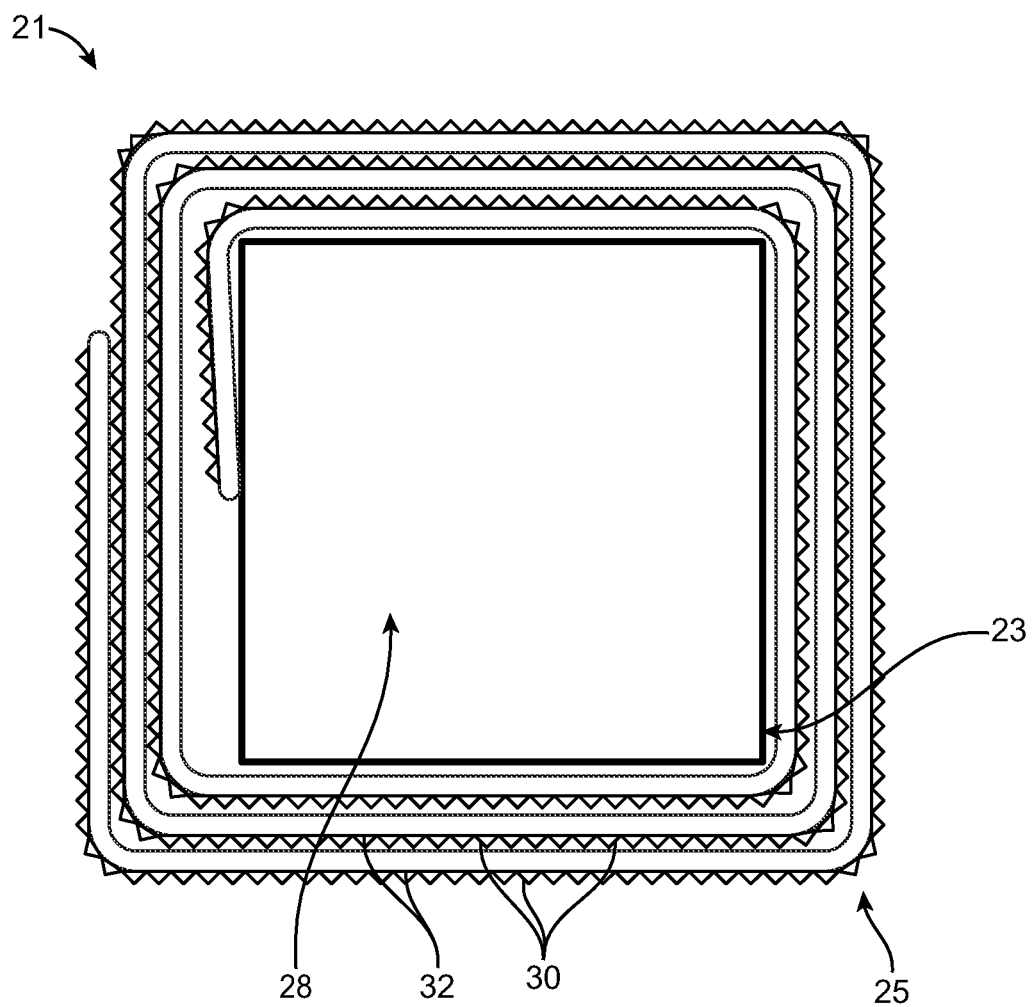
Figure 2C:
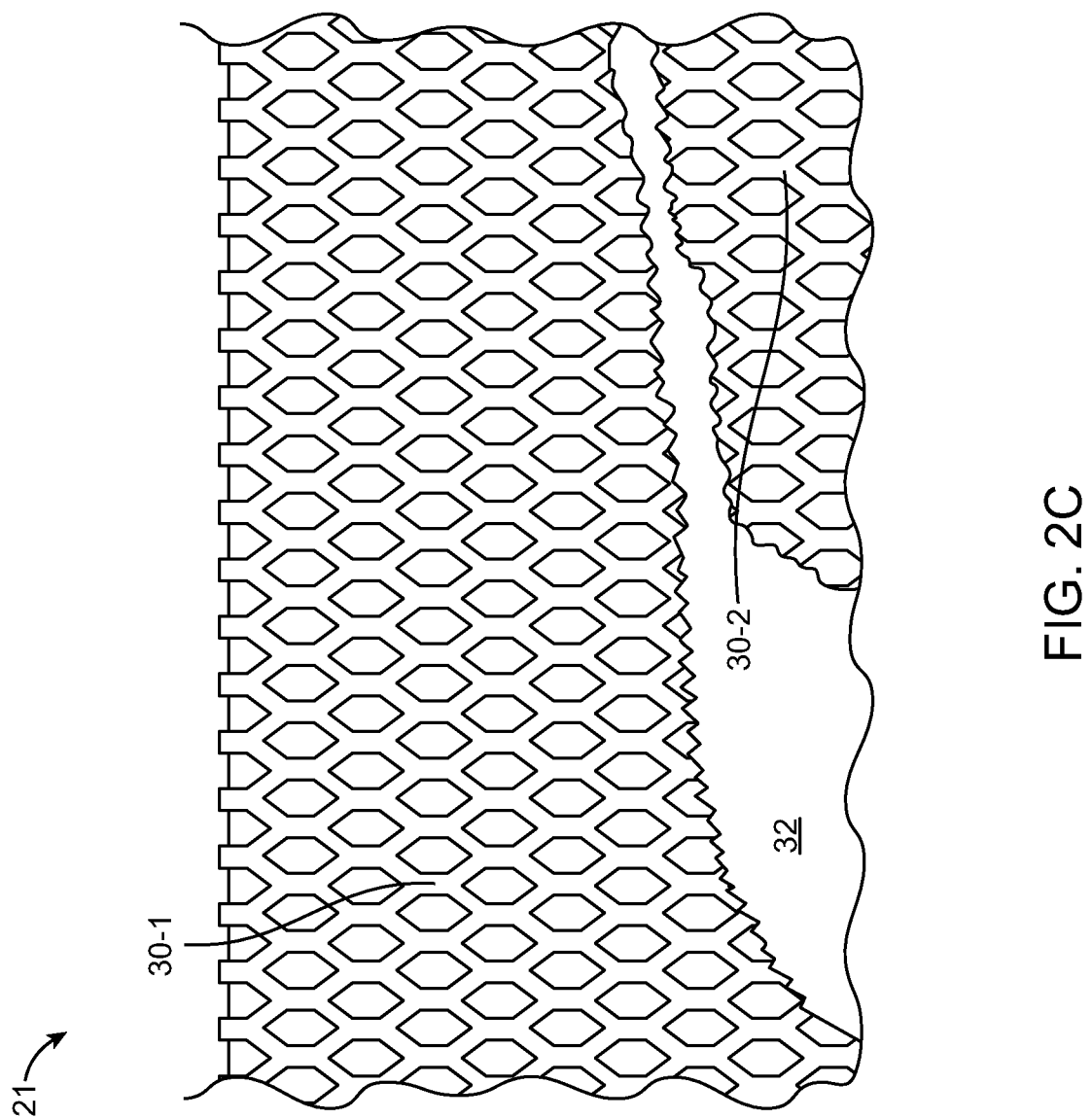
FIG. 2C is an enlarged fragmentary simplified side view, broken away in part, to show the two constituent layers of one winding of a bilayer material, as well as the outer layer of an underlying winding of the same bilayer material, for the insulation unit shown in FIG. 1.

Shipping system 11 may further comprise an insulation unit 21, which is also shown separately in FIGS. 2A, 2B and 2C. Insulation unit 21, in turn, may comprise a support 23 and a thermal insulation member 25. In the present embodiment, support 23 may be in the form of a sleeve comprising four side walls 26-1, 26-2, 26-3, and 26-4, an open top end, and an open bottom end. (Side wall 26-4 may include a tab that is glued to side wall 26-1 to form a closed structure.) Although, in the present embodiment, support 23 is generally square in lateral cross-section, it is to be understood that support 23 is not limited to such a shape and may assume any of a variety of different transverse cross-sectional shapes, such as, but not limited to, rectangular (but not square), circular, triangular, oval, and the like. The interior of support 23 may define a cavity 28 that may be used to receive a payload, as well as one or more passive temperature-control members and the like.

Support 23 may, itself, provide some degree of thermal insulation and may be made of or comprise materials including, but not limited to, corrugated cardboard, chipboard, or the like; alternatively, support 23 may be made of or comprise materials including, but not limited to, polymer, ceramic or the like. Preferably, support 23 is made of a sustainable material. Support 23 may be sufficiently rigid so as to be self-standing and so as to resist deformation while thermal insulation member 25 is being wrapped around it. Notwithstanding the above, if desired, support 23 (or insulation unit 21 as a whole) may be constructed so as to be collapsible to a completely flattened or significantly flattened state when not in use, thereby facilitating its storage and transportation. Moreover, as will be discussed further below, where support 23 is collapsible, insulation unit 21 may be formed by wrapping thermal insulation member 25 around support 23 while support 23 is in a collapsed state and then expanding support 23; alternatively, insulation unit 21 may be formed by wrapping thermal insulation member 25 around support 23 while support 23 is in an expanded state.

Thermal insulation member 25 may comprise a material, preferably a textured (i.e., structured, non-smooth) sheet material, that is wrapped a plurality of times (i.e., at least two complete times) around support 23, for example, in a spiral manner, the wrapped material preferably comprising an expanded slit-sheet packaging material, such as, for example, an expanded sheet of honeycombed Kraft paper. Such expanded slit-sheet packaging material, particularly an expanded sheet of honeycombed Kraft paper, may be characterized by an alternating pattern of voids that are connected by material that extends in opposite directions in an alternating pattern, thereby creating a three-dimensional structure that enables air flow through the three-dimensional structure in a variety of different directions.

Preferably, the textured sheet material is recyclable and/or compostable. In the present embodiment, the textured sheet material used to make thermal insulation member 25 may be a bilayer material comprising a first sheet 30 in the form of the aforementioned expanded slit-screen packaging material, which is textured, and a second sheet 32 that is non-textured, the non-textured second sheet 32 preferably serving to keep adjacent portions of the textured first sheet 30 from nesting or otherwise interacting with one another. (Notwithstanding the above, the non-textured second sheet 32 may be omitted from the textured sheet material, thereby leaving only the textured first sheet 30.) Second sheet 32 may comprise, for example, tissue paper. The sheet of tissue paper may serve to keep adjacent overlying/underlying portions of the expanded slit-sheet packing material from nesting with one another. This may be seen best in FIG. 2C, which shows second sheet 32 interposed between an upper wrap 30-1 of first sheet 30 and a lower wrap 30-2 of first sheet 30. Although not required, prior to wrapping the bilayer material, second sheet 32 may be fixed to first sheet 30. This may help to keep second sheet 32 from moving relative to first sheet 30 before, during, or after wrapping. Such fixation may be achieved, for example, using an adhesive applied to one or more longitudinally extending regions or zones on second sheet 32. Generally speaking, second sheet 32 does not have to be as wide as first sheet 30, but it could be as wide, and, if it is as wide, second sheet 32 may minimize nesting of successive layers of first sheet 30. On the other hand, in some cases, a little bit of nesting may increase the stability of the structure.

An example of a bilayer material of the type generally described above is disclosed in U.S. Pat. No. 11,059,256 B2, inventors Cheich et al., issued Jul. 15, 2021, which is incorporated herein by reference, and such a bilayer material is also commercially available as RANPAK READY ROLL® protective paper cushioning wrap (Ranpak Corp., Concord Township, Ohio). Additional information relating to such bilayer materials and/or to the expanded slit-sheet packaging material forming a layer thereof are disclosed in the following, all of which are incorporated by reference: U.S. Pat. No. 10,099,836 B2, inventor Cheich, issued Oct. 16, 2018; U.S. Pat. No. 5,688,578, inventor Goodrich, issued Nov. 18, 1997; U.S. Pat. No. 5,667,871, inventors Goodrich et al., issued Sep. 16, 1997; U.S. Patent Application Publication No. US 2020/0247079 A1, inventor Goodrich, published Aug. 6, 2020; and U.S. Patent Application Publication No. US 2016/0067938 A1, inventor Goodrich, published Mar. 10, 2016.

Thermal insulation member 25 may be formed, for example, by wrapping the textured sheet material continuously around support 23 two or more times to form a spiral-type product. Where, for example, the textured sheet material is a bilayer material of the type described above comprising an expanded sheet of honeycombed Kraft paper and a sheet of tissue paper, the textured sheet material may be wrapped around support 23 to a thickness of at least 1 in, preferably about 1-5 in, more preferably about 2-4 in, even more preferably about 2-3 in. To provide a thickness of about 2 in, the bilayer material may be wrapped around support 23 approximately 10-15 times—the specific number of times or wraps depending, in part, on how much tension is applied during wrapping. As can readily be appreciated, generally speaking, the greater the number of times that the bilayer material (or other textured sheet material) is wrapped around support 23, the greater the thickness of bilayer material and, as a result, the greater the thermal insulation provided. However, one feature of the present invention is that the number of times that the bilayer material (or other textured sheet material) may be wrapped around support 23 may be varied as desired to take into account, for example, the thermal properties needed, any dimensional constraints, and material costs.

It is to be noted that, although, in the present embodiment, the bilayer material of thermal insulation member 25 is oriented such that, for each wrap of the bilayer material, first sheet 30 is positioned outwardly relative to its second sheet 32, such an orientation may be reversed, i.e., second sheet 32 may be positioned outwardly relative to its first sheet 30. Also, where first sheet 30 is positioned outwardly relative to second sheet 32, the assembly, as a whole, may be exteriorly wrapped with an additional layer of second sheet 32.

The wrapping of the textured sheet material around support 23 to form thermal insulation member 25 may be performed manually, or such wrapping may be automated in whole or in part. Prior to wrapping the textured sheet material, one end of the textured sheet material may be secured to the exterior of support 23. This may help to maintain tension on the textured sheet material. In one embodiment, such securing may involve using an adhesive material, such as a strip of tape, a quantity of a hot melt glue, or the like, to adhere one end of the textured sheet material to support 23. In another embodiment, such securing may involve using a mechanical fastener, such as a clip, to fasten one end of the textured sheet material to the exterior of support 23. After wrapping, the clip or other mechanical fastener may be removed. In still another embodiment, such securing may simply involve temporarily manually holding an end of the textured sheet material against the support 23 until the end is secured by wrapping.

As noted above, the wrapping process may involve wrapping the textured sheet material around the exterior of support 23 two or more times. Where the textured sheet material is in the form of a roll, such wrapping may be facilitated by coupling support 23 to a turntable and then rotating the turntable while the textured sheet material unspools from the roll and wraps around support 23. During wrapping, an adhesive, such as a hot melt glue, may optionally be applied to the exterior of each wrap of insulation to cause a subsequently applied wrap to adhere to its underlying wrap. (This use of an adhesive is to be contrasted with the use of an adhesive discussed above to adhere the two constituent layers of bilayer material to each other.) By adhering adjacent wraps to one another, the stability of the wrapped insulation may be improved in the sense that the wrapped insulation cannot easily be unraveled or slide relative to adjacent wraps. The adhesive may be added, for example, parallel to the wrap direction in a continuous stream or perpendicular to the wrap direction at set intervals.

After the textured sheet material has been wrapped around support 23 (the textured sheet material being cut, if necessary, before or after such wrapping), the outer end of the textured sheet material may be secured to an underlying portion of the sheet, for example, using a strip of tape 38.

As alluded to above, where support 23 is constructed to be reversibly expandable/collapsible, such as may be the case where, for example, support 23 comprises a corrugated cardboard sleeve that may be reversibly transformable between (i) an expanded configuration having a generally rectangular transverse cross-section and (ii) a collapsed configuration formed, for example, by folding support 23 about a fold line between two adjacent side panels, insulation unit 21 may be made by wrapping the textured sheet material around support 23 either when support 23 is in an expanded configuration or when support 23 is in a collapsed configuration.

Where, for example, thermal insulation member 25 is formed around support 23 while support 23 is in an expanded configuration, the resulting insulation unit 21 may be used and stored/transported with support 23 in the expanded configuration. Alternatively, if desired, when insulation unit 21 is not in use, support 23 (preferably with thermal insulation member 25 still wrapped around support 23) may be transformed from an expanded configuration to a collapsed configuration for storage and/or transportation. Such a transformation may be effected, for example, by applying compressive force to the exterior of insulation unit 21 at points along a pair of opposing fold lines between adjacent side panels of support 23. Thereafter, for example, when insulation unit 21 is to be deployed, support 23 (preferably with thermal insulation member 25 still wrapped around support 23) may be transformed back to an expanded configuration from a collapsed configuration. Such a transformation may be effected, for example, by applying compressive force to the exterior of insulation unit 21 at points along the opposite two fold lines of support 23. After use, insulation unit 21 may then be transformed back to a collapsed configuration, which may then optionally be followed by additional transformations between the collapsed configuration and the expanded configuration.

Figure 3:
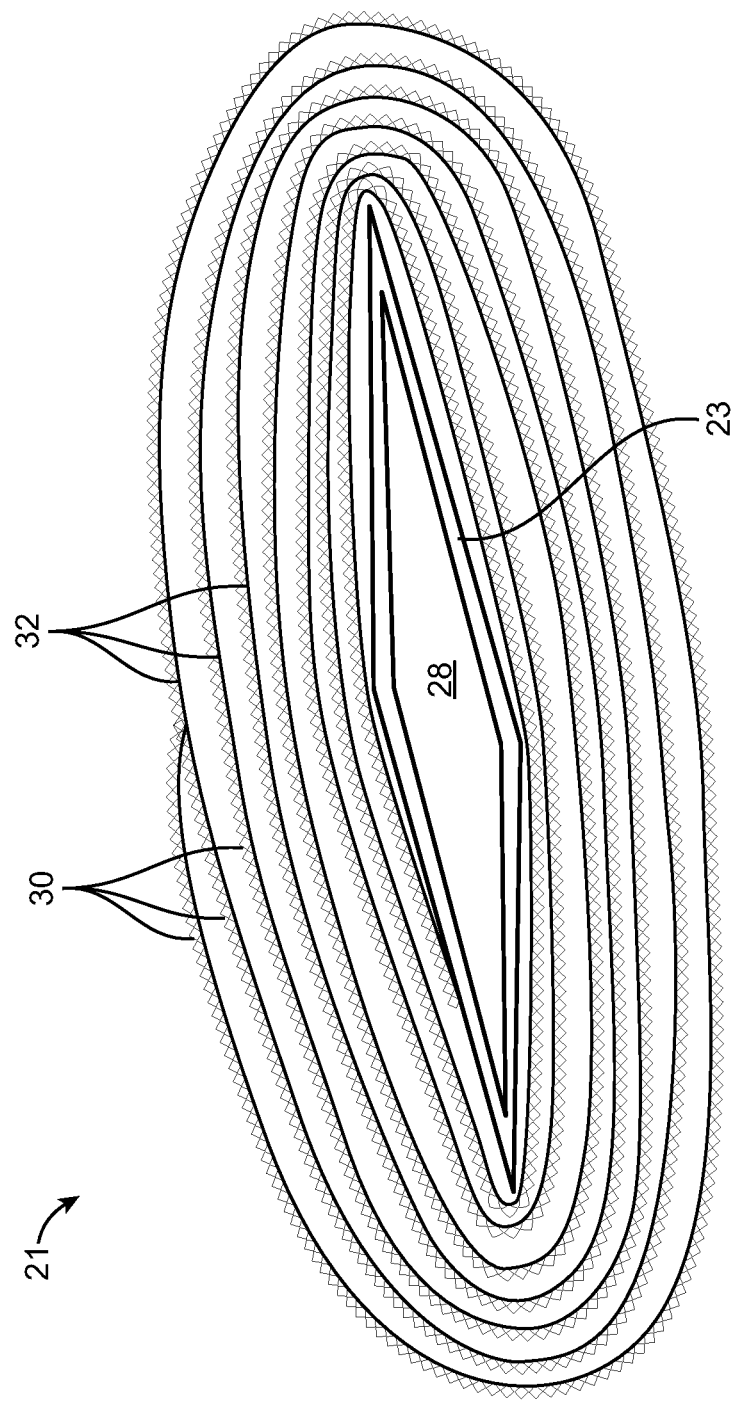
FIG. 3 is a simplified top view of the insulation unit of FIG. 1, with the support being shown in a collapsed configuration.

On the other hand, where, for example, thermal insulation member 25 is formed around support 23 while support 23 is in a collapsed configuration, which may involve being completely or significantly flattened (see FIG. 3), insulation unit 21 may be stored and/or transported with support 23 in such a collapsed configuration. Thereafter, for example, when insulation unit 21 is to be deployed, support 23 (preferably with thermal insulation member 25 still wrapped around support 23) may be transformed to an expanded configuration from a collapsed configuration. After use, insulation unit 21 may then be transformed back to a collapsed configuration, which may then optionally be followed by additional transformations between the collapsed configuration and the expanded configuration.

As can be appreciated, where insulation unit 21 comprises a support 23 that is collapsible, it is important that the textured sheet material not be wrapped so tightly around support 23 that the textured sheet material tears when support 23 is transformed between an expanded configuration and a collapsed configuration. This is particularly true in the case where the textured sheet material is wrapped around support 23 while support 23 is in a collapsed configuration and then expanded. Preferably, the textured sheet material is able to withstand some degree of stretching along its length so that it can accommodate the transformation of support 23 without tearing. The above-described bilayer material comprising an expanded sheet of honeycombed Kraft paper and a sheet of tissue paper has been found to be satisfactory in withstanding some stretching of this type. In particular, the sheet of honeycombed Kraft paper of the bilayer material tends to stretch longitudinally as it expands. Consequently, as such a sheet is unwound from a roll and wrapped around support 23, the sheet tends to stretch longitudinally (and contract along its width) as tension is applied thereto. The longitudinal stretch will typically continue until the width of the honeycombed sheet approaches the width of the tissue paper sheet. Therefore, generally speaking, if the bilayer material is wrapped around support 23 without succumbing to tearing under tension, the bilayer material should be able to avoid being torn when support 23 is transformed from a collapsed configuration to an expanded configuration.

Because insulation unit 21 is collapsible about its inner cavity, it can be easily flattened for storage or disposal (and may be recycled as a whole where support 23 and thermal insulation member 25 are made of recyclable materials). Furthermore, insulation unit 21 is capable of switching from a collapsed state (with a cavity of significantly reduced size or substantially no inner cavity) to an expanded state (with an inner cavity of significantly larger size (e.g., a three-dimensional rectangular cavity)) without damage to insulation unit 21. This provides at least the following benefits: (i) ease of business-to-business transport, as a collapsed state may be cheaper and easier to ship; (ii) ease of disposal for the end user, especially into narrow waste bins or recycling bins. Also, wrapping support 23 while it is in a collapsed state makes transport of the components more cost-effective, and may allow faster wrapping.

It is to be noted that, although the fabrication of thermal insulation member 25 is described above as being performed by wrapping the textured sheet material around support 23, one could form thermal insulation member 25 by wrapping the textured sheet material around a surrogate for support 23, such as a mandrel or the like, and then transferring the fabricated thermal insulation member 25 from the surrogate to support 23. Alternatively, one could fabricate thermal insulation member 25 by wrapping the textured sheet material around the surrogate for support 23 and then simply removing the fabricated thermal insulation member 25 from the surrogate, without using support 23.

Referring back to FIG. 1, outer box 13 and insulation unit 21 are preferably dimensioned so that insulation unit 21 may fit snugly into cavity 15 of outer box 13 and may sit directly on top of the bottom closure flaps of outer box 13.

Shipping system 11 may further comprise a bottom insulation member 27. Bottom insulation member 27 may be dimensioned to fit within support 23 and may be positioned at or near the open bottom end of support 23. Preferably, bottom insulation member 27 is dimensioned to snugly fit within the open bottom end of cavity 28 of support 23. Bottom insulation member 27 may comprise a conventional thermally insulating material, such as a pad of thermally insulating foam (e.g., polyethylene foam). Alternatively, as will be discussed further below, bottom insulation member 27 may comprise a plurality of stacked or wrapped layers of the above-described textured sheet material that collectively form a panel or pad. Bottom insulation member 27 may be similar in thickness to thermal insulation member 25 but need not be. Although not shown in the present embodiment, bottom insulation member 27 could be encapsulated in a bag or other type of container.

Shipping system 11 may further comprise a product box 31, in which the temperature-sensitive materials (not shown) may be disposed. Product box 31, which may be a conventional corrugated cardboard box, may be shaped to define a generally rectangular prismatic cavity dimensioned to hold a payload. Product box 31 is exteriorly dimensioned to fit within cavity 28 of support 23, and product box 31 may be dimensioned so that one or more of its side walls contact or are closely spaced from the side walls of support 23.

Shipping system 11 may further comprise a plurality of temperature-control members 41-1 and 41-2. Temperature-control members 41-1 and 41-2 may comprise a conventional phase change material pack, ice pack, or the like. For example, temperature-control members 41-1 and 41-2 may be similar or identical to the types of packaged phase change materials disclosed in U.S. Pat. No. 10,829,675 B2, inventors Formato et al., which issued Nov. 10, 2020. Although, in the present embodiment, only two temperature-control members are shown (with temperature-control member 41-1 intended to be positioned directly below product box 31 and directly on top of bottom insulation member 27 and with temperature-control member 41-2 intended to be positioned directly on top of product box 31), it is to be understood that there could be fewer than two temperature-control members (i.e., one or none) or that there could be more than two temperature-control members (e.g., at least one temperature-control member positioned along each of the six faces of product box 31). Also, it is to be understood that temperature-control members 41-1 and 41-2 may be identical in size, shape, and composition to one another or may differ from one another in one or more of size, shape, and composition.

Shipping system 11 may further comprise a top insulation member 51. Top insulation member 51 may be dimensioned to fit within support 23 and may be positioned at or near the open top end of support 23. Preferably, top insulation member 51 is dimensioned to snugly fit within the open top end of cavity 28 of support 23. Top insulation member 51 may be similar in construction to bottom insulation member 27.

It is to be understood that, although, in the present embodiment, bottom insulation member 27 and top insulation member 51 are positioned within cavity 28 of support 23, one or both of bottom insulation member 27 and top insulation member 51 could be positioned outside of support 23.

In use, the bottom closure flaps of outer box 13 may be closed and secured whereas top closure flaps 19-1 through 19-4 may be kept open. Next, insulation unit 21 may be positioned within cavity 15 of outer box 13. Next, bottom insulation member 27 may be positioned within the open bottom end of support 23, and temperature-control member 41-1 (which may be preconditioned to a desired temperature) may be positioned on top of bottom insulation member 27. Next, payload box 31, preferably containing a payload, may be positioned on top of temperature-control member 41-1, temperature-control member 41-2 (which may be preconditioned to a desired temperature) may be positioned on top of payload box 31, and top insulation member 51 may be positioned on top of temperature-control member 41-2. Next, top closure flaps 19-1 through 19-4 may be closed.

Following one or more uses of shipping system 11, if further use of shipping system 11 is no longer desired or if compact storage of shipping system 11 is desired, insulation unit 21 and outer box 13 may be recycled or otherwise disposed of together or stored together—either in an expanded state or in a collapsed state. Alternatively, insulation unit 21 may be removed from outer box 13, and insulation unit 21 and outer box 13 may be recycled or otherwise disposed of or stored, either in an expanded state or in a collapsed state, independently of one another. Also, thermal insulation member 25 may be removed from support 23, and the two may be recycled or otherwise disposed of or stored, either in an expanded state or in a recycled state, independently of one another. If outer box 13 and/or thermal insulation member 25 and/or support 23 is damaged, one may replace the damaged component(s) and reuse shipping system 11.

Figure 4:
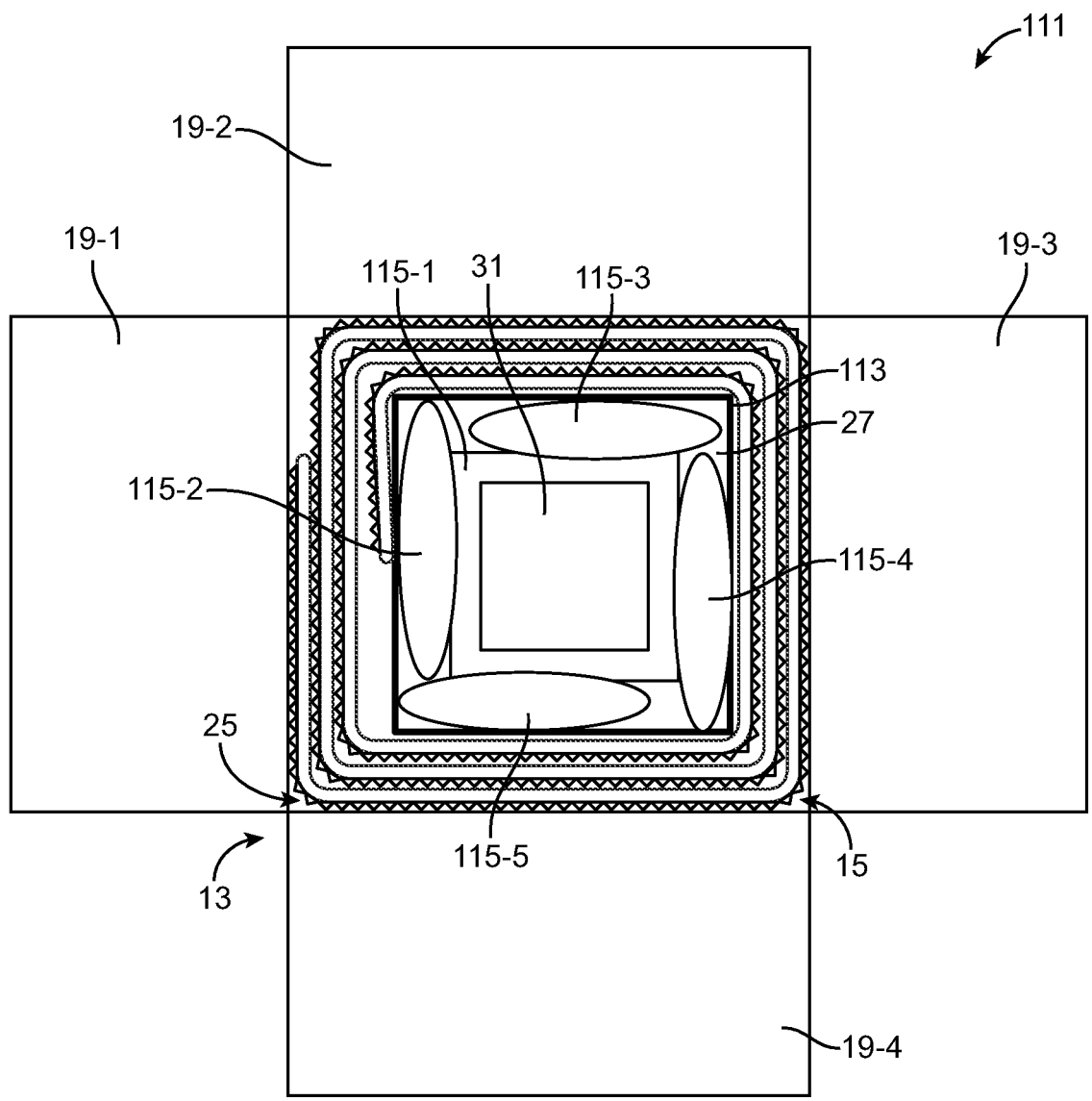
FIGS. 4 and 5 are simplified top and side section views, respectively, of a second embodiment of a shipping system constructed according to the present invention for maintaining temperature-sensitive materials within a desired temperature range for a period of time.
Figure 5:
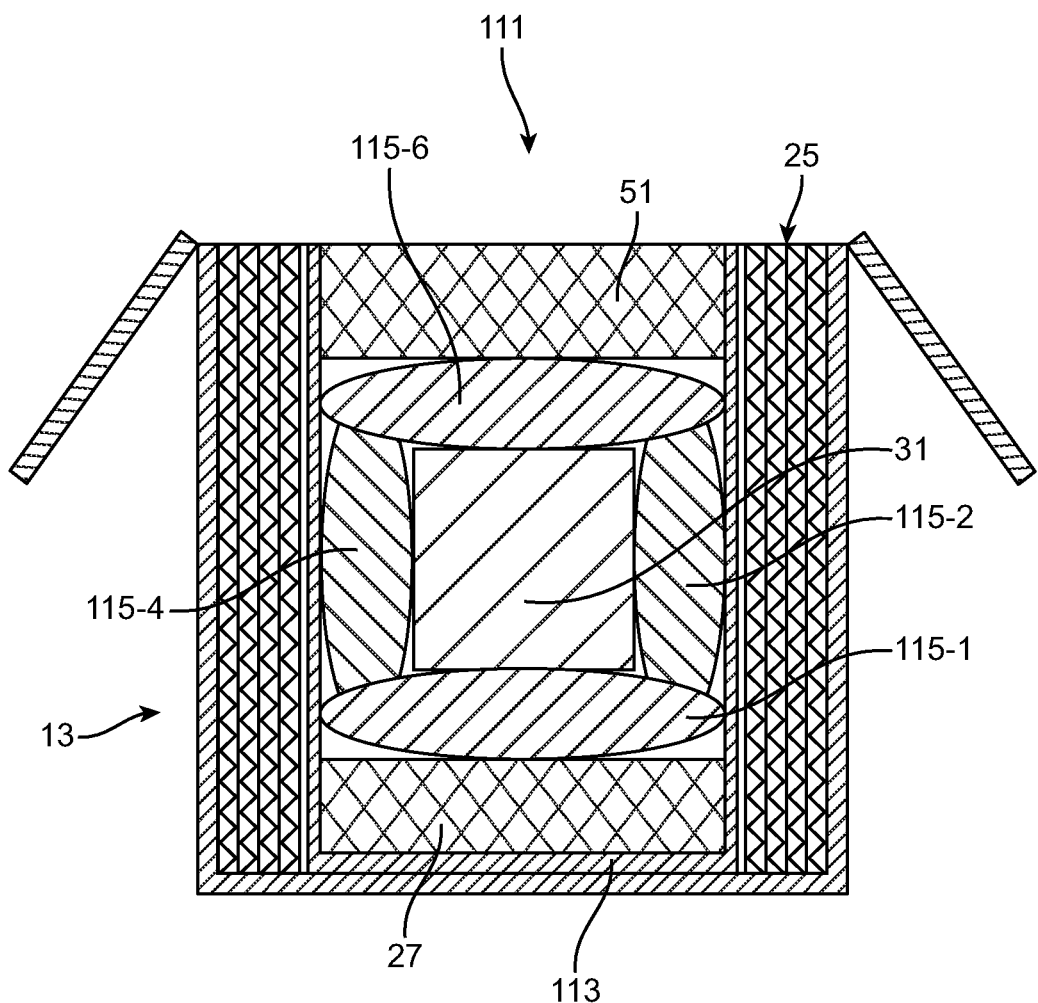

Referring now to FIGS. 4 and 5, there are shown various views of a second embodiment of a shipping system for maintaining temperature-sensitive materials within a desired temperature range for a period of time, the shipping system being constructed according to the present invention and being represented generally by reference numeral 111. (For simplicity and clarity, certain components of shipping system 111 that are not critical to the understanding of the present invention are either not shown or described herein or are shown and/or described herein in a simplified manner.)

Shipping system 111 may be similar to shipping system 11 in many respects. One difference between the two shipping systems may be that, whereas shipping system 11 may comprise a support 23 comprising an open bottom end and an open top end, shipping system 111 may instead comprise a support 113 comprising a closed bottom end and an open top end. For example, support 113 may be in the form of a half-slotted container (HSC) corrugate box (i.e., a box having closable bottom closure flaps and an open top (i.e., no top closure flaps or lid)). Alternatively, as in the embodiment shown, support 113 may be in the form of a molded structure whose bottom panel seamlessly connects to its side panels. As is the case with support 23, support 113 may be reversibly transformable between expanded and collapsed configurations. Thermal insulation member 25 may be wrapped around support 113 in a manner analogous to that discussed above for shipping system 11.

Another difference between shipping system 111 and shipping system 11 may be that, whereas shipping system 11 may comprise two temperature-control members 41-1 and 41-2, shipping system 111 may comprise six temperature-control members 115-1 through 115-6, with one of temperature-control members 115-1 through 115-6 facing each face of payload box 31 (temperature-control member 115-6 not being shown in FIG. 4). Temperature-control members 115-1 through 115-6 may be identical or different in size, shape and composition.

System 111 may be used in a manner similar to that described above for system 11.

Figure 6:
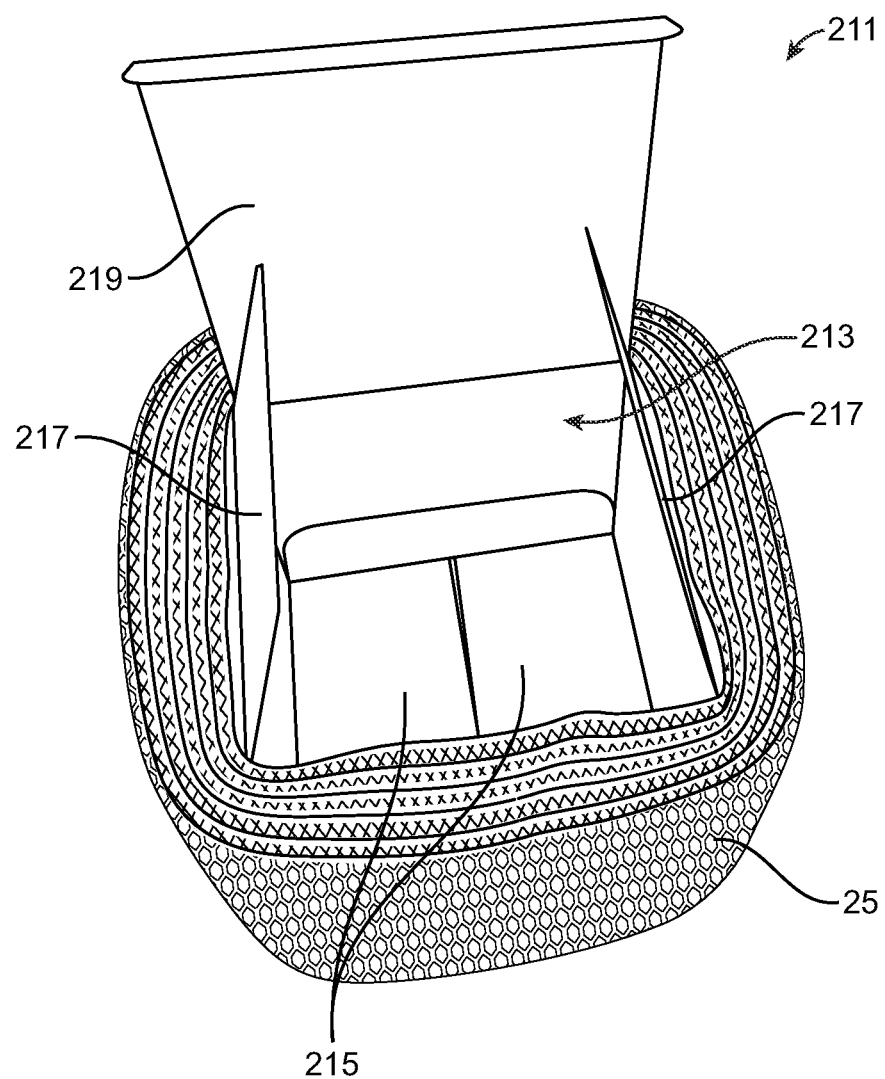
FIG. 6 is a perspective view of an alternative embodiment to the insulation unit of FIG. 1, the alternative insulation unit being constructed according to the present invention.

Referring now to FIG. 6, there is shown a perspective view of an alternative embodiment to insulation unit 21 of system 11, the alternative insulation unit being constructed according to the present invention and being represented generally by reference numeral 211. (For simplicity and clarity, certain components of insulation unit 211 that are not critical to the understanding of the present invention are either not shown or described herein or are shown and/or described herein in a simplified manner.)

Insulation unit 211 may be similar in many respects to insulation unit 21. One difference between the two insulation units may be that, whereas insulation unit 21 may comprise a support 23, insulation unit 211 may instead comprise a support 213. Support 213 may differ from support 23 in that, in addition to having four side walls, support 213 may also have a plurality of bottom closure fupport 213 215, a plurality of inner top closure fupport 213 217, and an outer top closure flap or lid 219. As can be appreciated, in another embodiment (not shown), support 213 could be a regular slotted container (RSC), in which all flaps are the same length, and the two outer flaps (normally the lengthwise flaps) are one-half the width of the container so that they meet at the center of the box when closed. As is the case with support 23, support 213 may be reversibly transformable between expanded and collapsed configurations.

Insulation unit 211 may be used similarly to insulation unit 21, except that bottom insulation member 27 may be positioned on top of closed bottom closure fupport 213 215, and top insulation member 51 may be placed under top closure fupport 213 217 and 219.

It is to be understood that, in any of the embodiments discussed above, instead of or in addition to using bottom insulation member 27 and top insulation member 51, one may dimension thermal insulation member 25 so that it extends beyond the top and bottom ends of support 23 and then one may slit, fold and secure the extended portions to cover the ends of support 23 (i.e., similar to wrapping the ends of a present with wrapping paper).

Figure 7:
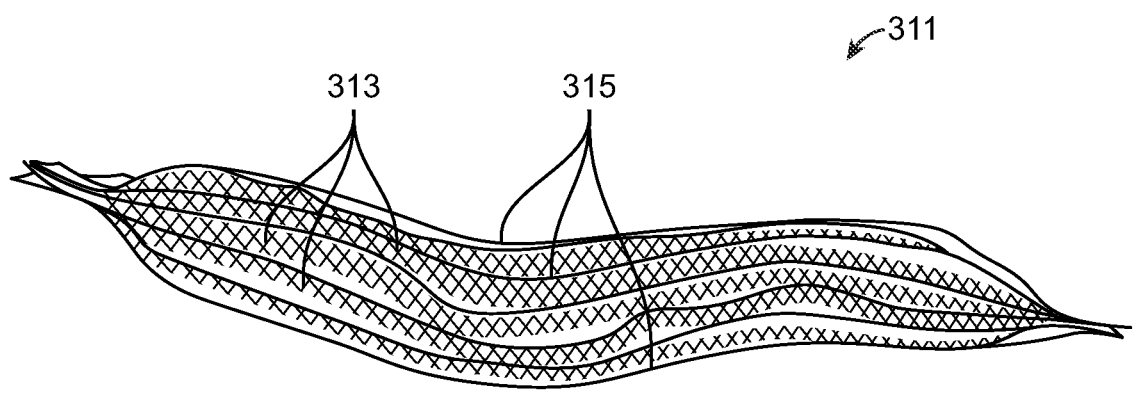
FIG. 7 is a side view of a first alternative embodiment to the top insulation member of FIG. 1 according to the present invention.

Referring now to FIG. 7, there is shown a perspective view of a first alternative embodiment to top insulation member 51 of system 11, the first alternative top insulation member being constructed according to the present invention and being represented generally by reference numeral 311. (For simplicity and clarity, certain components of top insulation member 311 that are not critical to the understanding of the present invention are either not shown or described herein or are shown and/or described herein in a simplified manner.)

Top insulation member 311, which may be used in the same fashion as top insulation member 51, may be in the form of a multilayer stack comprising expanded slit-sheet packaging material sheets 313 and heat-sealed sheets 315 arranged in an A-(B-A)$_n$-B-A pattern, wherein A is a heat-sealed sheet, B is an expanded slit-sheet packaging material sheet, and n is a natural number of at least 1 and preferably is at least 4. The heat-sealed sheets may be dimensioned to be greater in length and width than the expanded slit-sheet packaging material sheets so that, by heat-sealing the heat-sealed sheets at their respective peripheries, the expanded slit-sheet packing material sheets may be encapsulated between adjacent heat-sealed sheets. As can readily be appreciated, top insulation member 311 obviates the need for tape to hold together the various layers of material.

Although, in the present embodiment, heat-sealed sheets 315 are transparent, it is to be understood that heat-sealed sheets 315 need not be transparent and could be opaque.

It is to be understood that, in addition to or instead of replacing top insulation member 51 with top insulation member 311, bottom insulation member 27 may be replaced with an analogous insulation member. In fact, thermal insulation member 25 could also be replaced with one or more insulation members similar to insulation member 311.

Figure 8A:
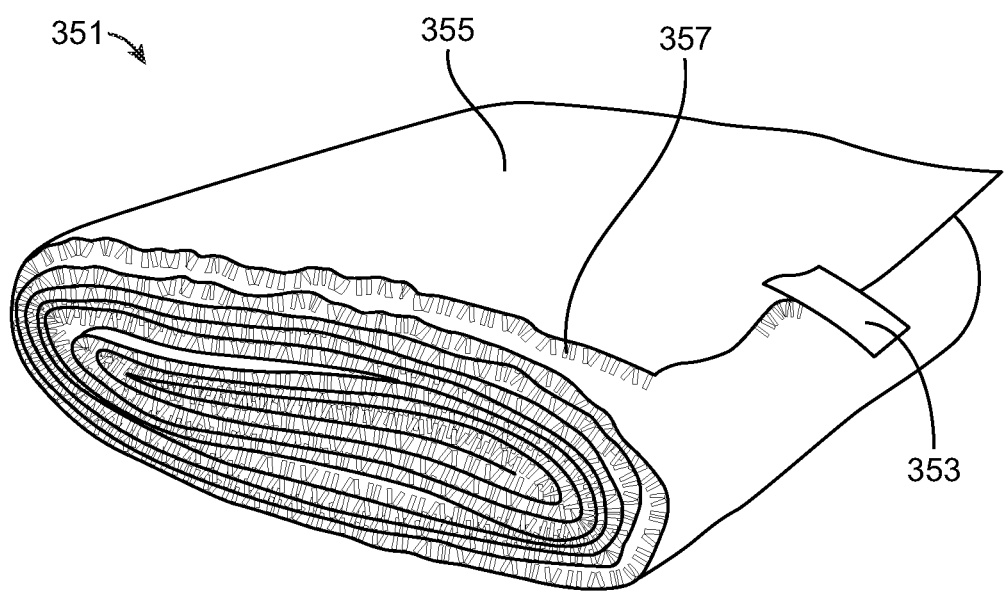
FIGS. 8A and 8B are top perspective and end views, respectively, of a second alternative embodiment to the top insulation member of FIG. 1 according to the present invention.
Figure 8B:
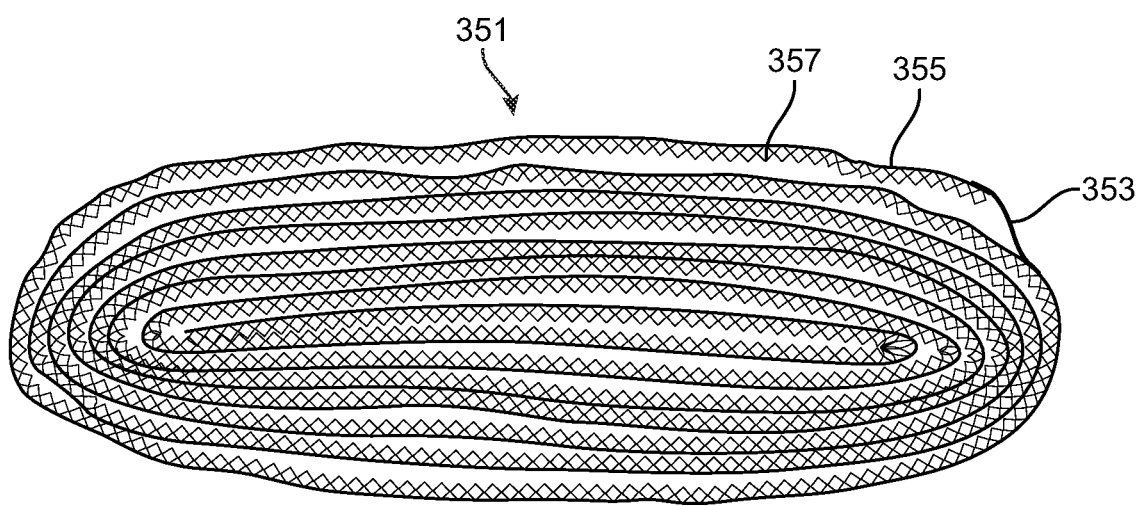

Referring now to FIGS. 8A and 8B, there is shown a perspective view of a second alternative embodiment to top insulation member 51 of system 11, the second alternative top insulation member being constructed according to the present invention and being represented generally by reference numeral 351. (For simplicity and clarity, certain components of top insulation member 351 that are not critical to the understanding of the present invention are either not shown or described herein or are shown and/or described herein in a simplified manner.)

Top insulation member 351, which may be used in the same fashion as top insulation member 51, may be formed by wrapping the above-discussed bilayer material upon itself several times and then securing the outer end to an underlying portion with tape 353. In the present embodiment, there are approximately 14 layers of the bilayer material, providing a thickness of about 2 ¼ inch; however, it is to be understood that the number of layers and the corresponding thickness are merely illustrative.

It is to be understood that, in addition to or instead of replacing top insulation member 51 with top insulation member 351, bottom insulation member 27 may be replaced with an analogous insulation member. In fact, thermal insulation member 25 could also be replaced with one or more insulation members similar to insulation member 351.

Also, it is to be understood that, although top insulation member 351 is shown with the bilayer material oriented so that the sheet of tissue paper 355 faces outwardly relative to the expanded sheet of honeycombed Kraft paper 357, the bilayer material need not be oriented in this manner and, instead, could be oriented so that expanded sheet of honeycombed Kraft paper 357 faces outwardly relative to the sheet of tissue paper 355. Moreover, where sheet 357 is positioned outwardly relative to sheet 355, the assembly, as a whole, may be exteriorly wrapped with an additional layer of sheet 355.

Figure 9:
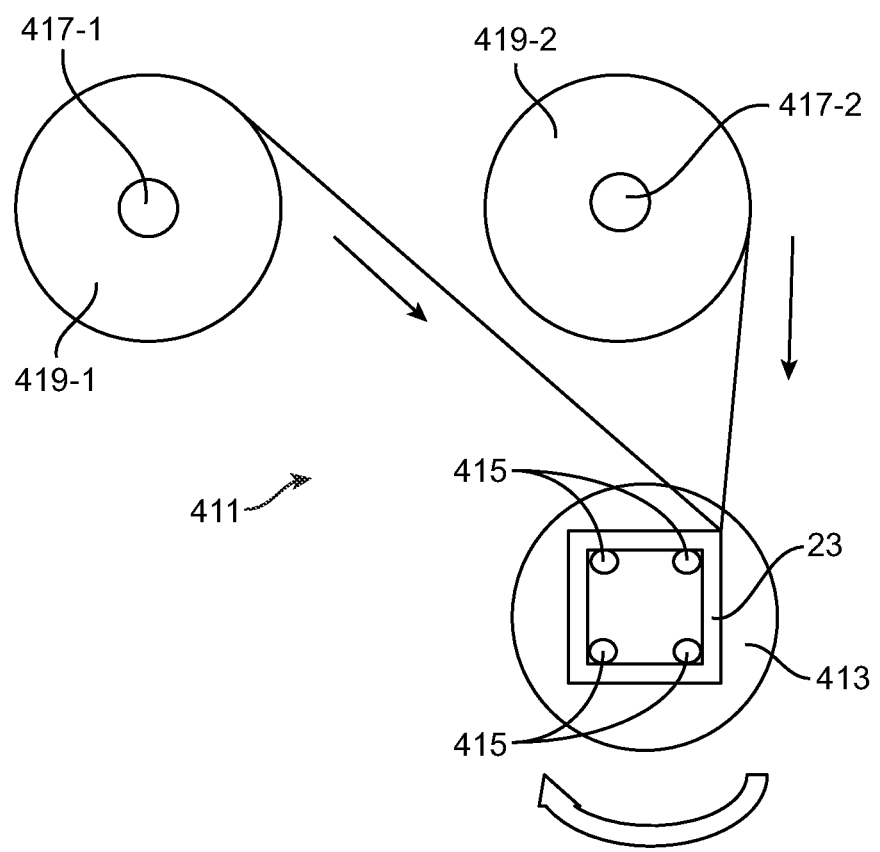
FIG. 9 is a schematic top view of a first embodiment of a system constructed according to the present invention for manufacturing the insulation unit of the system of FIG. 1.

Referring now to FIG. 9, there is schematically shown a first embodiment of a system for manufacturing insulation unit 21, the system being constructed according to the present invention and being represented generally by reference numeral 411. (For simplicity and clarity, certain components of system 411 that are not critical to the understanding of the present invention are either not shown or described herein or are shown and/or described herein in a simplified manner.)

System 411 may comprise a turntable 413, which may be manually rotatable or which may be powered by a motor (not shown). A plurality of gurntable 415 may be fixed to turntable 413 and may extend upwardly therefrom. Gurntable 415 may be inserted into and engage support 23 and, thus, may be used to removably couple support 23 to turntable 413.

System 411 may further comprise a plurality of reels 417-1 and 417-2. A first roll 419-1 of textured sheet material, which is preferably an expanded slit-sheet packaging material, may be mounted on reel 417-1, and a second roll 419-2 of textured sheet material, which is also preferably an expanded slit-sheet packaging material, may be mounted on reel 417-2. Rolls 419-1 and 419-2 may include identical types of textured sheet material but need not. Alternatively, one of rolls 419-1 and 419-2 may include a textured sheet, such as a sheet of expanded slit-sheet packaging material, and the other of rolls 419-1 and 419-2 may include a non-textured sheet, such as a sheet of tissue paper, whereby the combination of sheets from rolls 419-1 and 419-2 forms a bilayer textured sheet material. In other words, one of rolls 419-1 and 419-2 may be textured and the other one of rolls 419-1 and 419-2 may be textured, in the same or different fashion, or may be non-textured.

In use, support 23 may be mounted on turntable 413, and the free ends of rolls 419-1 and 419-2 may be fixed to the exterior of support 23. (In FIG. 9, the free ends of rolls 419-1 and 419-2 are shown fixed to the exterior of support 23 at one of the exterior corners of support 23, and rolls 419-1 and 419-2 are just beginning to be wrapped around support 23.) Such fixture may be effected using adhesive tape or the like or may simply be effected by holding the free ends of rolls 419-1 and 419-2 in place temporarily on support 23 with a finger or tool. Turntable 413 may then be rotated, which may cause the textured sheet material of rolls 419-1 and 419-2 to be wrapped one or more times around support 23, preferably under moderate tension. When the texture sheet material has been wrapped a desired number of times around support 23, the rotation of turntable 413 may be stopped, the textured sheet materials may be cut, and the cut end(s) may be taped or otherwise secured to the underlying wrapping.

It is to be understood that, although system 411 is shown with two reels, system 411 could have as few as a single reel or as many as three or more reels. As can be appreciated, an advantage to have multiple reels is that one may more quickly achieve a desired number of wrappings of the textured sheet material around support 23.

Also, it is to be understood that, although system 411 is configured to wrap the textured sheet material around a support 23 that is in an expanded state, system 411 could be modified, for example, by repositioning gurntable 415 to accommodate a support 23 that is in a collapsed state.

Moreover, it is also to be understood that, although system 411 is shown with a support 23 having a sleeve shape, system 411 may be used with a support whose bottom (and, optionally, whose top) may be selectively opened and closed, for example, by using closure flaps; consequently, system 411 may be used with many types of regular slotted containers and half slotted containers.

It is further to be understood that system 411 may be partially or fully automated in its operation.

Figure 10:
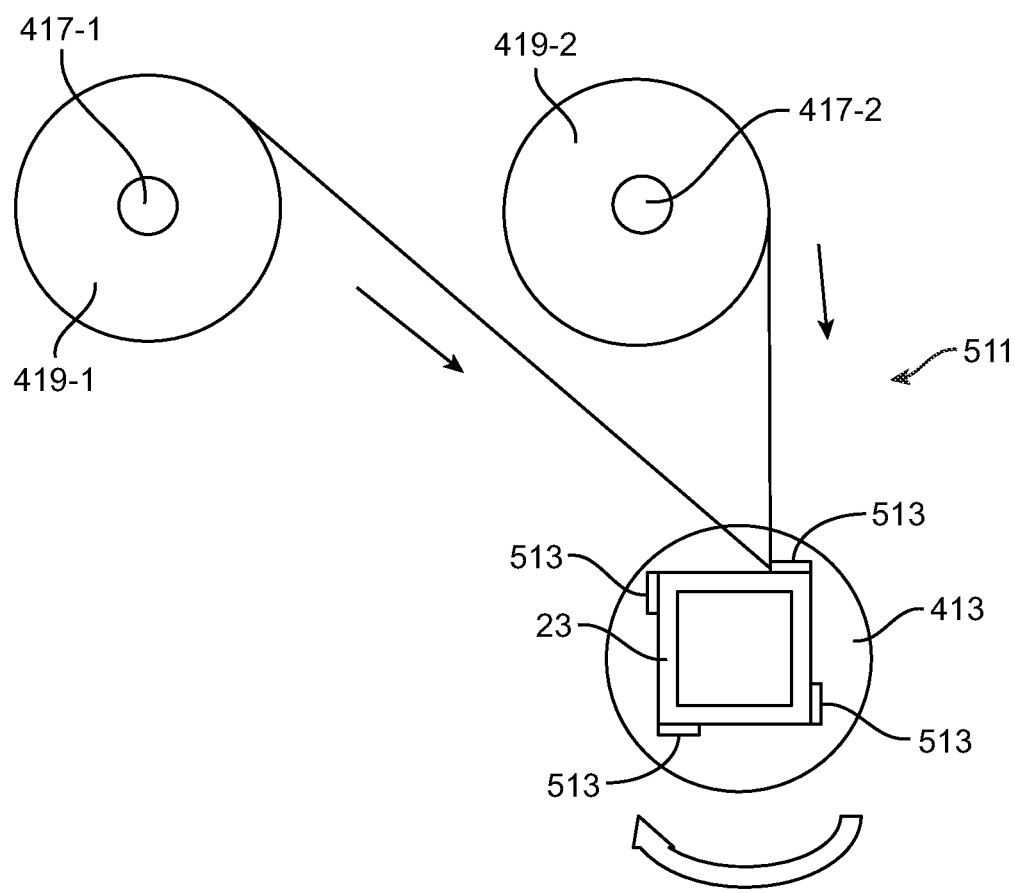
FIG. 10 is a schematic top view of a second embodiment of a system constructed according to the present invention for manufacturing the insulation unit of the system of FIG. 1.

Referring now to FIG. 10, there is schematically shown a second embodiment of a system for manufacturing insulation unit 21, the system being constructed according to the present invention and being represented generally by reference numeral 511. (For simplicity and clarity, certain components of system 511 that are not critical to the understanding of the present invention are either not shown or described herein or are shown and/or described herein in a simplified manner.)

System 511 may be similar in many respects to system 411. One difference between the two systems may be that, whereas system 411 may include gurntable 415, which may be inserted into the interior of support 23, system 511 may include paddles 513, which may be positioned around and engage the exterior of support 23. Consequently, system 511 may be better suited for use with supports that have a closed bottom, such as regular slotted containers and half slotted containers whose bottom flaps are closed.

As in the case of system 411, system 511 may further comprise a plurality of reels 417-1 and 417-2. A first roll 419-1 of textured sheet material, which is preferably an expanded slit-sheet packaging material, may be mounted on reel 417-1, and a second roll 419-2 of textured sheet material, which is also preferably an expanded slit-sheet packaging material, may be mounted on reel 417-2. Rolls 419-1 and 419-2 may include identical types of textured sheet material but need not. Alternatively, one of rolls 419-1 and 419-2 may include a textured sheet, such as a sheet of expanded slit-sheet packaging material, and the other of rolls 419-1 and 419-2 may include a non-textured sheet, such as a sheet of tissue paper, whereby the combination of sheets from rolls 419-1 and 419-2 forms a bilayer textured sheet material. In other words, one of rolls 419-1 and 419-2 may be textured and the other one of rolls 419-1 and 419-2 may be textured, in the same or different fashion, or may be non-textured.

System 511 may be operated in a similar manner to system 411, one difference being that, in system 511, the free ends of rolls 419-1 and 419-2 may be held in place between one of paddles 513 and support 23. (In FIG. 10, the free ends of rolls 419-1 and 419-2 are shown fixed to the exterior of support 23 near one of paddles 513, and rolls 419-1 and 419-2 are just beginning to be wrapped around support 23.)

It is to be understood that, although system 511 is configured to wrap the textured sheet material around a support 23 that is in an expanded state, system 511 could be modified, for example, by repositioning paddles 513 to accommodate a support 23 that is in a collapsed state.

Figure 11:
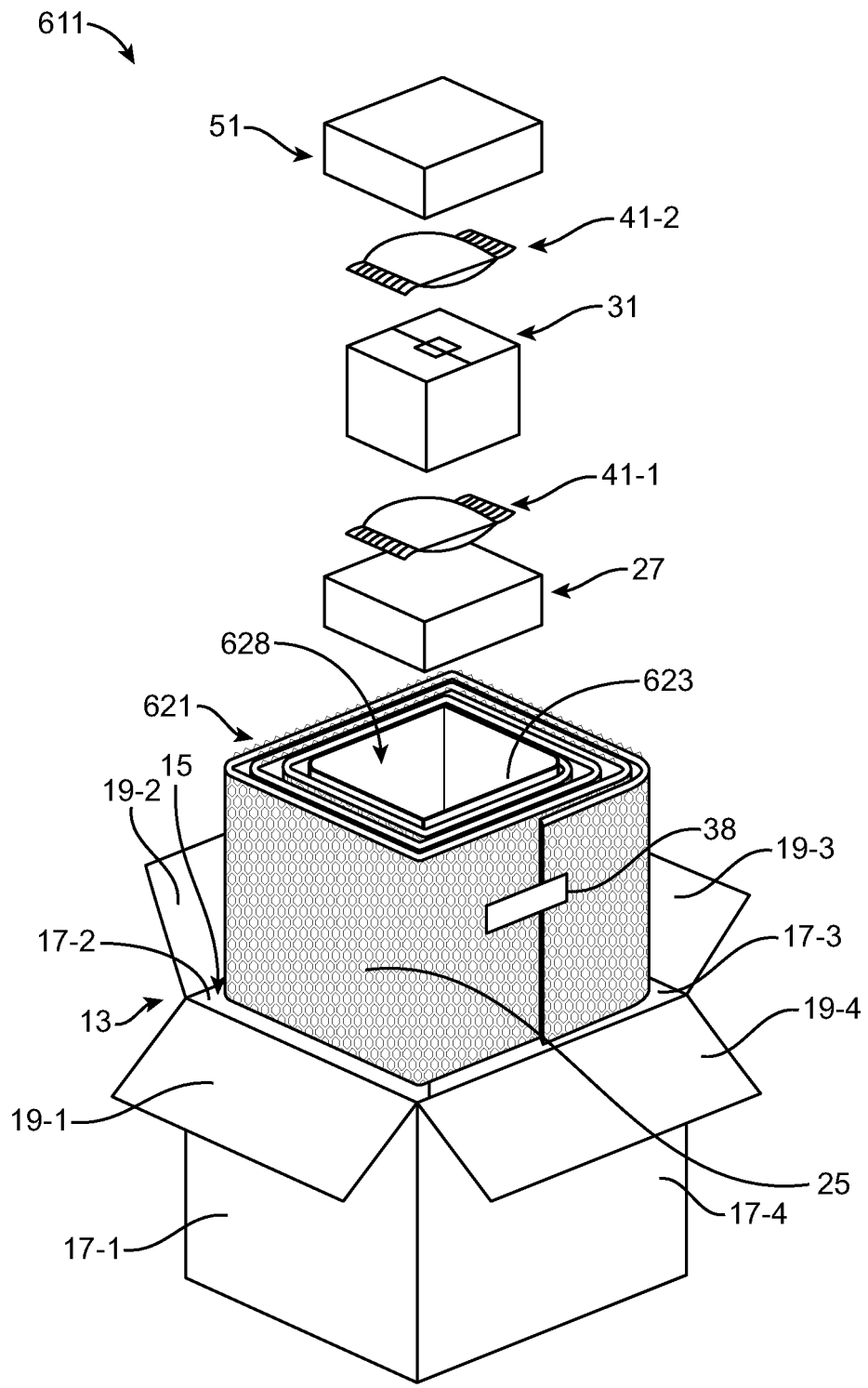
FIG. 11 is a simplified perspective view of a third embodiment of a shipping system constructed according to the present invention for maintaining temperature-sensitive materials within a desired temperature range for a period of time.

Referring now to FIG. 11, there is shown a simplified perspective view of a third embodiment of a shipping system for maintaining temperature-sensitive materials within a desired temperature range for a period of time, the shipping system being constructed according to the present invention and being represented generally by reference numeral 611. (For simplicity and clarity, certain components of shipping system 611 that are not critical to the understanding of the present invention are either not shown or described herein or are shown and/or described herein in a simplified manner.)

Figure 12A:
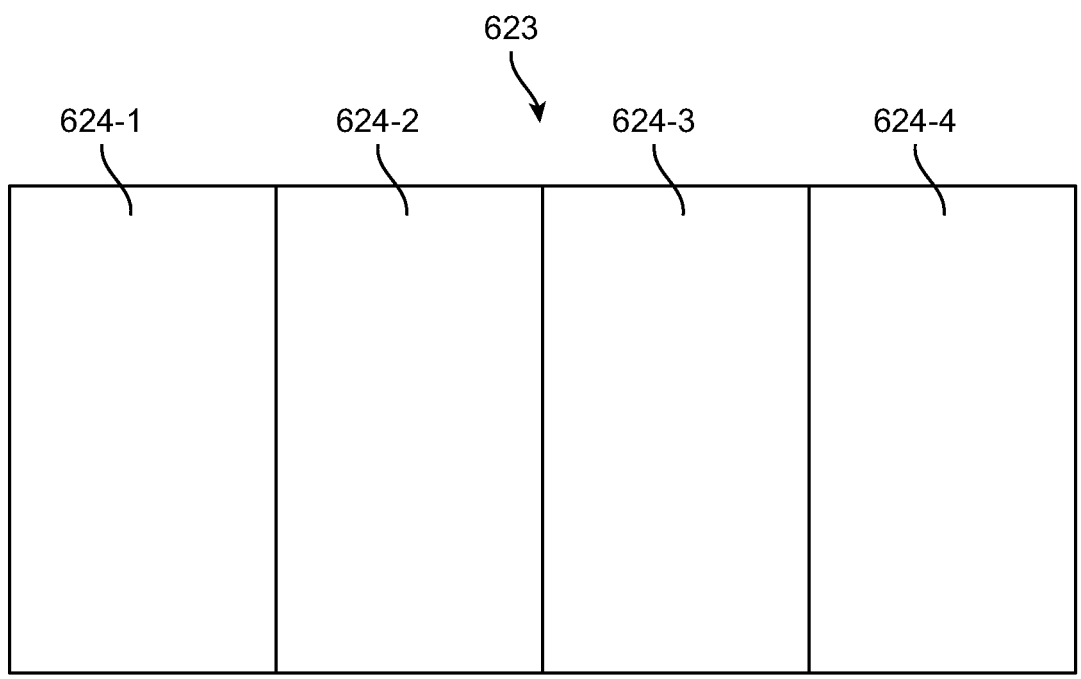
FIG. 12A is a simplified side view of the support of the system of FIG. 11, the support being shown in an unfolded state.

System 611 may be similar in many respects to system 11. One difference between the two systems may be that, whereas system 11 may comprise a support 23, system 611 may, instead, comprise a support 623. Support 623, which is also shown separately in FIGS. 12A and 12B, may comprise four similarly dimensioned phase change material blocks 624-1 through 624-4 that are joined together to form a saddlebag assembly (also sometimes referred to simply as a saddlebag (i.e., a heat-sealed package or assembly with two or more attached but typically distinct sections, each section of which may contain a quantity of phase change material, the assembly being foldable between adjacent sections)).

Figure 12B:
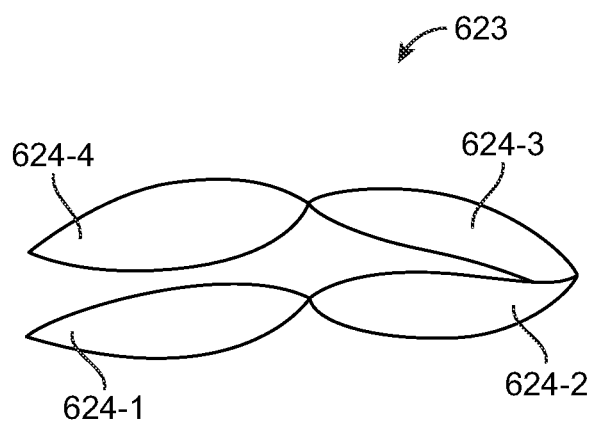
FIG. 12B is a simplified end view of the support of FIG. 12A, the support being shown in a folded state.

According to one embodiment, support 623 may be folded along the seam connecting blocks 624-2 and 624-3 such that two of the blocks are positioned over the other two of the blocks (see FIG. 12B). With support 623 thus folded, support 623 may then be wrapped with the textured sheet material in the fashion described above. Thereafter, support 623 may be expanded, thereby creating a four-sided structure (which, in this example, may be of square cross-section because all sides are of equal dimension), said four-sided structure defining a cavity 628 in which product box 31, temperature-control members 41-1 and 41-2, and insulation members 27 and 51 may be positioned.

It is to be understood that, if desired, one could omit one or both of temperature-control members 41-1 and 41-2 from system 611.

Figure 13:
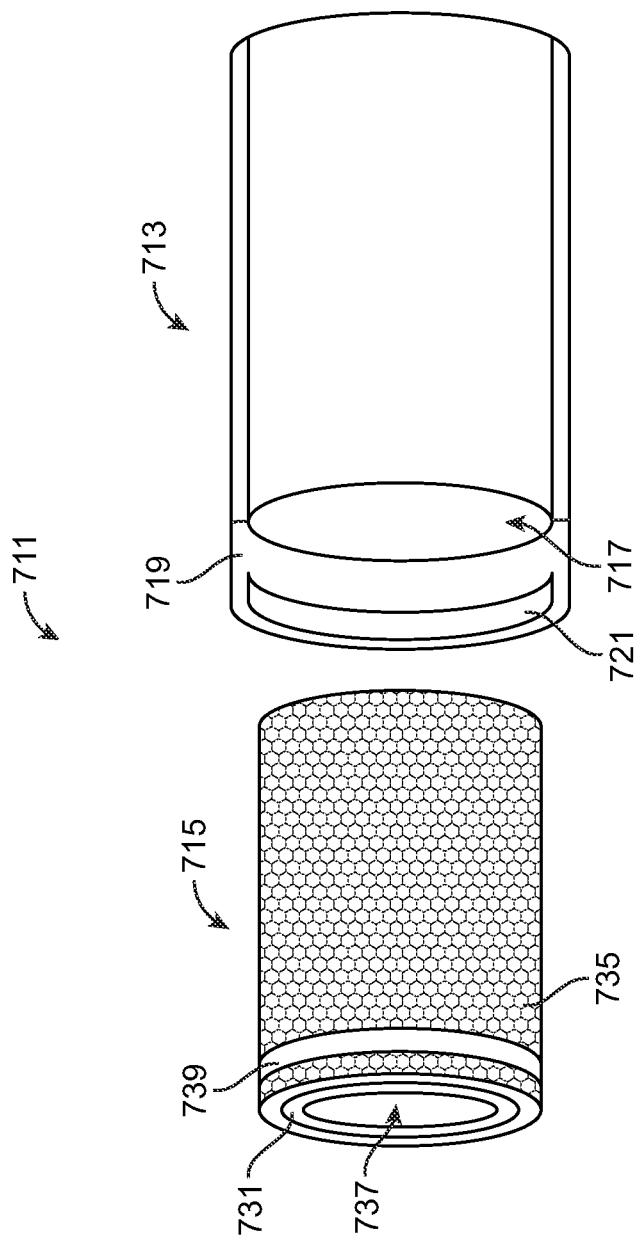
FIG. 13 is a partly exploded perspective view of a fourth embodiment of a shipping system constructed according to the present invention for maintaining temperature-sensitive materials within a desired temperature range for a period of time.

Referring now to FIG. 13, there is shown a simplified partly exploded perspective view of a fourth embodiment of a shipping system for maintaining temperature-sensitive materials within a desired temperature range for a period of time, the shipping system being constructed according to the present invention and being represented generally by reference numeral 711. (For simplicity and clarity, certain components of shipping system 711 that are not critical to the understanding of the present invention are either not shown or described herein or are shown and/or described herein in a simplified manner.)

System 711, which may be in the form of a mailer, may comprise an envelope 713 and an insulation unit 715.

Envelope 713 may be conventional in size, shape, and construction and may be shaped to include an opening 717 at one end, the opposite end being sealed. A flap 719 may be provided proximate to opening 717 for use in closing opening 717. An adhesive strip 721, which may be covered by a release liner (not shown), may be used to keep flap 719 in a closed state.

Insulation unit 715, which may be dimensioned for insertion into envelope 713 through opening 717, may be similar in some respects to insulation unit 21. To this end, insulation unit may comprise a support 731 and a thermal insulation member 735 that is wrapped multiple times, for example, continuously in a spiral manner, around support 731. However, whereas support 23 may be generally rectangular in transverse cross-section, support 731 may be shaped to resemble an elliptic cylinder albeit with an opening 737 at one end, the opposite end being drawn together at a seam. Support 731 may be made of a heavy-weight paper or similar material, and thermal insulation member 735 may be made of a textured sheet material, such as the bilayer material discussed above.

An adhesive strip 739 may encircle at least a portion of the exterior of thermal insulation member 735 and may be used to secure insulation unit 715 within envelope 713.

System 711 may be assembled by inserting insulation unit 715 into envelope 713 and securing insulation unit 715 within envelope using adhesive strip 739. Once assembled, system 711 may be used by inserting a payload, and preferably one or more passive temperature-control members, through opening 737 into the cavity of support 731, and then by sealing envelope 713 by closing and adhering flap 719.

Figure 14:
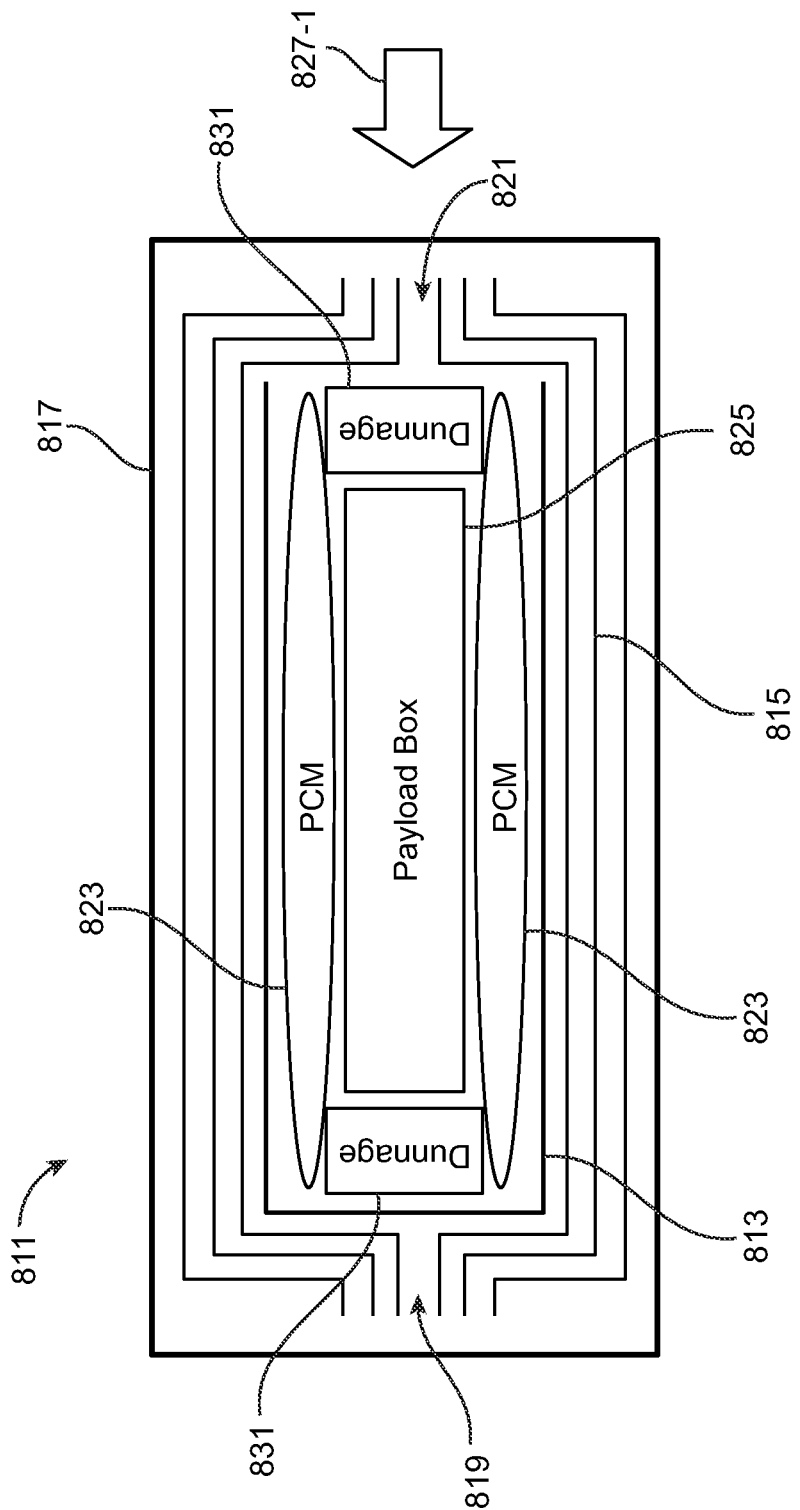
FIGS. 14 and 15 are simplified schematic side and front section views, respectively, of a fifth embodiment of a shipping system constructed according to the present invention for maintaining temperature-sensitive materials within a desired temperature range for a period of time.
Figure 15:
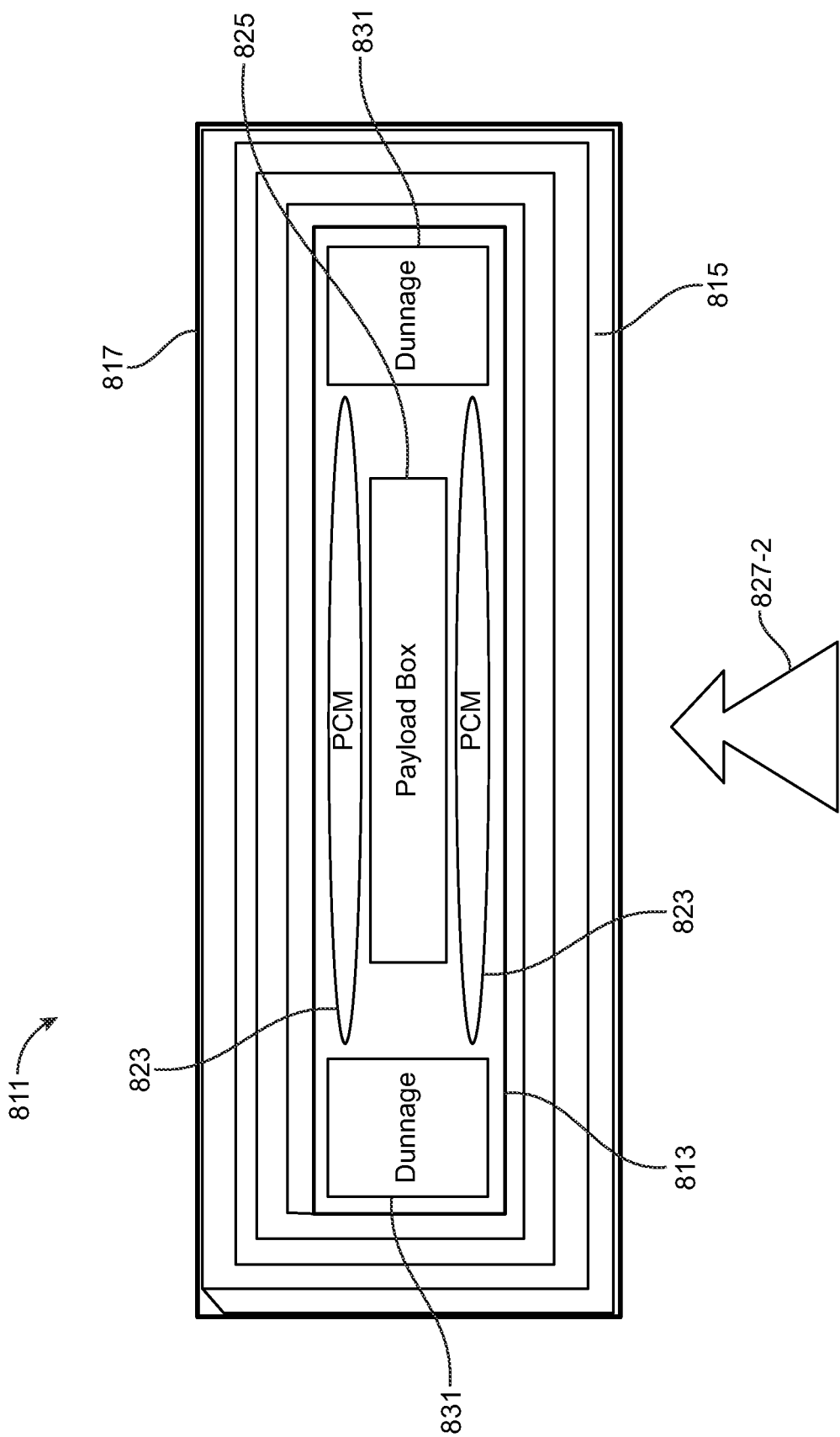

Referring now to FIGS. 14 and 15, there are shown various views of a fifth embodiment of a shipping system for maintaining temperature-sensitive materials within a desired temperature range for a period of time, the shipping system being constructed according to the present invention and being represented generally by reference numeral 811. (For simplicity and clarity, certain components of shipping system 811 that are not critical to the understanding of the present invention are either not shown or described herein or are shown and/or described herein in a simplified manner.)

System 811 may be similar in many respects to system 11. One difference between the two systems may be that, whereas system 11 may comprise a support 23, system 811 may instead comprise a support 813. Support 813 may differ notably from support 23 in that support 813 may have length and width dimensions that are significantly different from one another. Consequently, although support 813 may create an inner cavity that is rectangular in shape, when support 813 is tipped on its side, such a cavity may be wide, but short, creating an opening similar to an envelope or a thin box. Thermal insulation member 815, which may be similar in composition to thermal insulation member 25, may then be wrapped around the exterior of support 813 multiple times to reach a desired uniform thickness. The combination of support 813 and thermal insulation member 815 may then be placed in an outer box 817 that fits the combination of support 813 and thermal insulation member 815 snugly on all sides. Due to the length dimension of support 813 being significantly smaller than its width dimension, overhanging insulation layers of thermal insulation member 815 may act as both a bottom insulation panel 819 and a top insulation panel 821, eliminating the need for separate insulation panels in system 811. Therefore, it is advantageous in system 811 for the thermal insulation member 815 to be intentionally longer than the depth of the support 813 at both ends. These overhanging insulation layers are then folded under the base of support 813 when placed inside outer box 817, and folded over the top of support 813 once phase change materials 823 and a payload box 825 are placed inside support 813. (The direction of loading of materials into support 813 is indicated by arrow 827-1 in FIG. 14 and arrow 827-2 in FIG. 15.) System 811 may also include dunnage materials 831 within support 813, ideally at the base and top of the cavity of support 813, or along the sides of the cavity of support 813, depending on the product load size, as this can vary between end users.

System 811 may be used analogously to system 11.

Some desirable features, attributes and/or advantages of one or more embodiments of the present invention are as follows:

insulation units and shipping systems may be able to be made locally and on demand at low capital cost insulation unit may be made by a simple manufacturing process equipment for making insulation unit may be easily transported and assembled at remote locations and may have lower power requirements than an extruder equipment for making insulation unit may be powered on and off at the touch of a switch, unlike an extruder which requires heating and multiple process adjustments to achieve steady-state manufacturing; consequently, far less waste material may be created by the invention insulation unit may be made at the same site that complete shippers are assembled, saving on shipping costs and possibly import taxes insulation unit may be constructed to have thermal conductivity similar to extruded starch wrapped insulation material may be seamless, i.e., no seams through which thermal leaks may occur insulation unit may be varied in thickness as desired by varying number of windings insulation unit may be constructed to be stored flat or made flat; starting materials may take up little space insulation unit may be made of sustainable, recyclable and/or compostable materials support and thermal insulation member of insulation unit may be constructed to easily be separated if desired (in some cases, thermal insulation member may be slipped off support or cut off support)

system may be constructed to provide thermal protection for up to 24-48 hours or longer entire insulation unit may be constructed to be collapsible, possibly even in combination with the outer box entire insulation unit may be made to be recyclable, i.e., without separating the thermal insulation member from the support bilayer material or similar thermal insulating material may be stored in rolls prior to being used for wrapping the "wrapping of multiple coils of insulation" minimizes or eliminates thermal leaks wrapped insulation creates a three-dimensional structure with a network of air flow channels in a plurality of directions The following examples are given for illustrative purposes only and are not meant to be a limitation on the invention described herein or on the claims appended hereto.

EXAMPLES

A prototype shipping container was constructed according to the invention (Example 1) and compared to a molded EPS shipping container (Example 2) and a flat EPS panel shipping container (Example 3), all three containers being of similar dimensions and tested under the same conditions.

Example 1

Six phase change material assemblies were obtained. These assemblies, item number 711G12+5C-S manufactured by Cold Chain Technologies, LLC, Franklin, Mass., consist of 315 total grams of 5° C. phase change temperature KOOLIT® Advanced PCM Gel, the gel arranged in sets of two pieces of dimensions 3¼ inches length×7 inches width×½ inch height, sealed separately "saddlebag" style within leak-proof film. The KOOLIT® Advanced PCM Gel comprises saturated hydrocarbons and gelling agent as described in U.S. Pat. No. 10,077,389 B2, inventors Formato et al., which issued Sep. 18, 2018, and which is incorporated herein by reference. The phase change material assemblies were frozen prior to use by conditioning them at a temperature of 0° C. for at least 4 hours.

All other shipper components were stored and assembled at room temperature (20° C. to 25° C.).

An inner corrugate box was acquired, made from fiberboard of "B-Flute" wall thickness, inner box dimensions 5¾ inches length×5¾ inches width×5¾ inches height, and box design FEFCO 0713 (having three top flaps, one oversized for tucking in, as defined by European Federation of Corrugated Board Manufacturers). A temperature logger (InTemp CT402 data logger with glycol bottle, purchased from Onset Computer Corporation, Bourne, Mass.) was placed inside this box, along with layers of bubble wrap (³⁄₁₆$^{th}$ inch bubble height and ⅜ inch bubble diameter) above and below the temperature logger to center it within the box, and closed.

An outer corrugate box was acquired, made from fiberboard of "C-Flute" wall thickness type, inner box dimensions of approximately 12 inches×12 inches×12 inches, and box design FEFCO 0201 (having four top flap closures, as defined by European Federation of Corrugated Board Manufacturers). The box was folded to shape, with bottom flaps taped shut and lid flaps left open. A corrugate rectangular prism with four side pieces and an open bottom and top was made using four pieces of C-flute, dimensions 8 inches×8 inches with side pieces pinwheeled together and taped with packing tape, to serve as a removable support structure. Bilayer material (RANPAK READY ROLL® wrapping and packaging paper (Ranpak Corp., Concord Township, OH), 14 inches×200 feet, made from Kraft paper and tissue paper) was purchased from Amazon.com. This bilayer material was rolled around the support structure 14 times, taking care to apply moderate tension so that the resulting wrapped structure was reasonably snug. These 14 layers of bilayer material provided a total thickness of about 2¼ inches of insulation around all four sides of the support structure. The end of the bilayer material was cut and adhered to the rest of the roll with packing tape. The 14-layer bilayer material on the support structure was trimmed to 12-inch height so that its height was approximately equal to the height of the cavity within the outer corrugate box. The roll of bilayer material was placed inside the outer corrugate box. The support structure was removed, leaving the unsupported roll of bilayer material inside the outer corrugate box.

One top insulation panel and one bottom insulation panel were each constructed from 14 layers of the bilayer material to the same thickness as the roll on the support structure (2¼ inch thick). Panels were constructed by rolling the bilayer material onto itself, with no support structure, until the final width (8¼) and thickness (2¼) were reached, while taking care to apply moderate tension so that the resulting wrapped structure was reasonably snug. The bilayer material was then cut, with the cut end taped to the rest of the panel. The panels were then cut to length (8¼ inches), parallel to the rolling direction, so that the spiral pattern could still be seen on the cut surface and so that the two wrapped edges remained intact.

The bottom insulation panel was placed inside the roll of bilayer material, so that it acted as an insulative base panel. This compressed both the edges of the bottom insulation panel and the inner wall of the roll of bilayer material slightly. The frozen phase change material assemblies and the inner corrugate box containing the temperature logger were placed on top of the bottom panel, inside the roll of bilayer material. The top insulation panel was placed on top of the materials within the roll of bilayer material, acting as an insulative lid panel. Like the addition of the bottom panel, this action compressed the edges of the top panel and the inner walls of the roll of bilayer material slightly. The outer corrugate flaps were then closed and secured with packing tape. This also compressed the surface of the top panel and edges of the roll of bilayer material slightly.

The assembled shipping container was then placed in a thermal test chamber (TestEquity Model 140 Temperature Chamber from Shon's Scientific Refrigeration Service Co., Inc., Dedham, Mass.) set to hold a temperature of 30° C.±1° C. The test was ended once it was determined that the inside of the shipping container reached a temperature above 8° C., as measured wirelessly using the temperature logger. From test start to test end (once the shipper internal temperature reached 8° C.), the duration was 18.3 hours.

Example 2

The same six phase change material assemblies described in Example 1 were preconditioned to a temperature of 0° C., as described above. All other shipper components were stored and assembled at room temperature (20° C. to 25° C.). The same inner corrugate box with data logger, described in Example 1, was re-used.

An expanded polystyrene (EPS) molded cooler and EPS lid were acquired (item #KT888-CISU, manufactured by Cold Chain Technologies, LLC, consisting of cooler of inner dimensions 8 inches×8 inches × 8 inches and matching tongue and groove lid, the cooler and lid both having wall thickness 1¾ inch and EPS density 1.25 lb/ft³).

This EPS molded cooler was placed inside an outer corrugate box (C-flute, inner dimensions 11⅝ inches length×11⅝ inches width×11¼ inches height, box design FEFCO 0201).

The six frozen phase change material assemblies and the inner corrugate box containing the temperature logger were placed inside the EPS molded cooler. The EPS lid was placed on top, using the tongue and groove to obtain a good fit, and the outer corrugate flaps were folded and secured with packing tape.

The assembled shipping container was then placed in a thermal test chamber at 30° C., as described above. From test start to test end (once the shipper reached 8° C.), the duration was 18.3 hours.

Example 3

The same six phase change material assemblies described in Example 1 were preconditioned to a temperature of 0° C., as described above. All other shipper components were stored and assembled at room temperature (20° C. to 25° C.). The same inner corrugate box with data logger, described in Example 1, was re-used.

An outer corrugate box was acquired, made from fiberboard of "C-Flute" wall thickness type, inner box dimensions of approximately 12 inches×12 inches×12 inches, and box design FEFCO 0201. This box was the same as the outer box of Example 1. The box was folded to shape, with bottom flaps taped shut and lid flaps left open. Four side insulation boxes made of fiberboard of "B-flute" wall thickness, inner dimensions 9¾ inches length×8 inches width×1¾ inch height, and box design FEFCO 0401 (folder type box that starts flat, with four parts that, when hinged, form the side walls and flaps, as defined by European Federation of Corrugated Board Manufacturers) were each filled with one EPS cut sheet of 1 inch thickness (EPS density 1 lb/ft³) and one EPS cut sheet of ¾ inch (EPS density 1 lb/ft³) thickness, stacked, so that together they filled the space within the side boxes. One top insulation box and one bottom insulation box were prepared similarly: two boxes (B-flute, inner dimensions 11¾ inches length×11¾ inches width×1¾ inch height, FEFCO 0401) were filled with EPS cut sheet of both 1 inch and ¾ inch thickness, stacked, so that together they filled the space inside the boxes. Flaps of all six boxes were folded and secured with packing tape.

The bottom insulation box was placed at the bottom of the outer corrugate box. The four side insulation boxes were arranged in a pinwheel pattern on the bottom insulation box. The six frozen phase change material assemblies and the inner corrugate box containing the temperature logger were placed inside the pinwheeled side boxes. The top insulation box was placed on top of the pinwheeled side boxes. The outer corrugate flaps were folded and secured with packing tape.

The assembled shipping container was then placed in a thermal test chamber at 30° C., as described above. From test start to test end (once the shipper reached 8° C.), the duration was 18.8 hours. The results of testing for the shippers of Examples 1 through 3 are presented below in Table 1.

TABLE 1

| Description | Duration (hours) |
|---|---|
| Example 1. Prototype shipping container | 18.3 |
| Example 2. Shipping container with EPS molded cooler | 18.3 |
| Example 3. Shipping container with EPS cut sheet in boxes | 18.8 |

Thermal conductivity of the 14-layer bilayer insulation was calculated by measuring the heat flux and thickness (FOX 304 Heat Flow Meter by Lasercomp/TA Instruments, New Castle, Del.) at a mean temperature of 20° C. The same was done for samples of the EPS cut sheet (density 1 lb/ft³). The thermal conductivity results are presented below in Table 2.

TABLE 2

| Description | Density (lb/ft³) | Thermal Conductivity (W/mK) |
|---|---|---|
| 14-layer bilayer insulation from Example 1 | 2.1 | 0.048 |
| Molded EPS equivalent to Example 2 | 1.25 | 0.0365 |
| EPS cut sheet from Example 3 | 1.0 | 0.038 |

Example 4

The same six phase change material assemblies described in Example 1 were preconditioned to a temperature of 0° C., as described above. All other shipper components were stored and assembled at room temperature (20° C. to 25° C.). The same inner corrugate box with data logger, described in Example 1, was re-used.

An outer corrugate box was acquired, made from fiberboard of "C-Flute" wall thickness type, inner box dimensions of approximately 12 inches x 12 inches x 12 inches, and box design FEFCO 0201. The box was folded to shape, with bottom flaps taped shut and lid flaps left open. This box was the same dimensions as the outer box of Example 1. A second inner corrugate box was acquired, made from fiberboard of "C-Flute" wall thickness type, inner box dimensions of approximately 8 inches×8 inches×12 inches, and box design FEFCO 0201 with no lid flaps. This box was folded to shape, with bottom flaps taped shut. This second inner box served as the support structure. Bilayer material (RANPAK READY ROLL® wrapping and packaging paper (Ranpak Corp., Concord Township, Ohio), 14 inches×200 feet, made from Kraft paper and tissue paper) was taped to the support structure, and then rolled around the support structure approximately 11 times until an insulation thickness of about 2¼ inches, including the support structure thickness, was reached on all four sides, taking care to apply moderate tension so that the resulting wrap structure was reasonably snug. The end of the bilayer material was cut and adhered to the rest of the roll. While marketed as a 14" wide product, the bilayer material did not require trimming in this example to fit within the outer corrugate box of dimensions 12 inches×12 inches×12 inches; thus, no trimming was done. The roll of bilayer insulation, along with the support structure, was placed inside the outer box. The support structure was not removed, and remained part of the insulation construction.

One top insulation panel and one bottom insulation panel were each constructed of the bilayer insulation material to the same thickness as the roll of bilayer insulation and support structure (2¼ inches thick). Top and bottom panels were each constructed with 16 wraps to reach this thickness. Panels were constructed by rolling the bilayer material onto itself, with no support structure, until the final width (about 8 inches) and thickness (2¼ inches) were reached. The bilayer material was then cut and taped to the rest of the panel. The panels were then cut to length (about 8 inches), parallel to the rolling direction, so that the spiral pattern could still be seen on the cut surface and so that the two wrapped edges remained intact.

The bottom insulation panel was placed inside the support structure, so that it acted as an insulative base panel. This compressed the edges of the bottom insulation panel slightly, creating a snug fit. The preconditioned phase change material (PCM) assemblies and the inner corrugate box containing the temperature logger were placed on top of the bottom panel, inside the support structure. The top insulation panel was then placed on top of the materials within the support structure, acting as an insulative lid panel. Like the bottom panel, this action compressed the edges of the panel slightly. The outer corrugate flaps were then closed and secured with packing tape. This also compressed the surface of the top panel and the edges of the roll of bilayer material slightly.

The assembled shipper was then tested the same way as in Example 1. From test start to test end, the duration was 17.4 hours.

Example 5

The same assembled shipper, phase change materials, and inner corrugate box were prepared for testing as described in Example 4, with the exception of 20 mL of additional tap water being poured onto the preconditioned PCM assemblies as they were placed on top of the bottom panel. This water was added to simulate extreme condensation within the assembled shipper during a test.

The assembled shipper was then tested the same way as in Example 1. From test start to test end, the duration was 16.8 hours.

Example 6

The same six phase change material assemblies described in Example 1 were preconditioned to a temperature of 0° C., as described above. All other shipper components were stored and assembled at room temperature (20° C. to 25° C.). The same inner corrugate box with data logger, described in Example 1, was re-used.

An outer corrugate box was acquired, made from fiberboard of "C-Flute" wall thickness type, inner box dimensions of approximately 12 inches×12 inches×12 inches, and box design FEFCO 0201. The box was folded to shape, with bottom flaps taped shut and lid flaps left open. This box was of the same dimensions as the outer box of Example 1. A second inner corrugate box was acquired, made from fiberboard of "C-Flute" wall thickness type, inner box dimensions of approximately 8 inches×8 inches×12 inches, and box design FEFCO 0201 with no lid flaps. This box was folded to shape, with bottom flaps taped shut. This second inner box served as the support structure. A monolayer material (HexcelWrap$^{TM}$ cushioning Kraft paper (Hexcel-Pack, LLC, Bristol, Conn.) 15.25 inches×300 feet in self-dispensed box, made from white Kraft paper) was purchased from Amazon.com. This monolayer material was taped to the support structure, and then rolled around the support structure approximately 23 times until an insulation thickness of about 2¼ inches, including the support structure thickness, was reached on all four sides, taking care to apply moderate tension so that the honeycomb structure was expanded thoroughly and the wrap structure was reasonably snug. The end of the monolayer material was cut and adhered to the rest of the roll. The monolayer insulation was then trimmed to 12-inch height so that its height was approximately equal to the height of the cavity within the outer corrugate box. The roll of monolayer material, along with the support structure, was placed in the outer corrugate box. The support structure was not removed, and remained part of the insulation construction.

One top insulation panel and one bottom insulation panel were each constructed of the monolayer insulation material to the same thickness as the roll of monolayer insulation and the support structure (2¼ inches thick). Top and bottom panels were each constructed with approximately 40 wraps to reach this thickness. Panels were constructed by rolling the monolayer material onto a support of C-flute corrugate of dimensions 6½ inches×6½ inches, until the final width (about 8 inches) and thickness (2¼ inches) were reached. The bilayer material was then cut and taped to the rest of the panel. The panels were then cut to length (about 8 inches), parallel to the rolling direction, so that the spiral pattern could still be seen on the cut surface and so that the wrapped edge remained intact.

The bottom insulation panel was placed inside the support structure, so that it acted as an insulative base panel. This compressed the edges of the bottom insulation panel slightly, creating a snug fit. The frozen PCM assemblies and the inner corrugate box containing the temperature logger were placed on top of the bottom panel, inside the support structure. The top insulation panel was then placed on top of the materials within the support structure, acting as an insulative lid panel. Like the bottom panel, this action compressed the edges of the panel slightly. The outer corrugate flaps were then closed and secured with packing tape. This also compressed the surface of the top panel and the edges of the roll of bilayer material slightly.

The assembled shipper was then tested the same way as in Example 1. From test start to test end, the duration was 13.0 hours. The results of testing for the shippers of Examples 4 through 6 are presented below in Table 3.

TABLE 3

| Description | Duration (hours) |
|---|---|
| Example 4. Layered insulative shipping container, bilayer material | 17.4 |
| Example 5. Layered insulative shipping container, bilayer material, with added water | 16.8 |
| Example 6. Layered insulative shipping container, monolayer material | 13.0 |

Only a minor decrease in shipper duration (0.6 hours, 3% of Example 4 duration) was observed with the addition of 20 mL of water to the bilayer insulation shipper, which was considered an extreme condensation case. Therefore, even extreme condensation is not expected to significantly reduce shipper performance when the bilayer material is used.

A significant decrease in shipper duration (3.6 hours, 21% of Example 4 duration) was observed when the bilayer insulation was replaced with monolayer insulation. It is expected that this was caused by the lack of a barrier between the expanded Kraft paper layers, which allowed the layers to nest within one another. This nesting in the monolayer insulation does not allow for uniform air pockets and resulted in significantly more layers being needed to create the same overall insulation thickness (23 layers around the support structure for monolayer vs. 11 layers around the support structure for the bilayer). This increased amount of layers also resulted in heavier insulation, with the monolayer material surrounding the support structure weighing 29% more than the bilayer material (490 g vs. 380 g, with the support structure weighing 160 g).

The thermal conductivities of the top insulation panel from Examples 4 and 6 was calculated by measuring the heat flux and thickness (FOX 304 Heat Flow Meter by Lasercomp/TA Instruments) at a mean temperature of 20° C. The thermal conductivity results are provided below in Table 4.

TABLE 4

| Description | Density (lb/ft³) | Thermal Conductivity (W/mK) |
|---|---|---|
| Top insulation panel of Example 4 (bilayer) | 1.6 | 0.054 |
| Top insulation panel of Example 6 (monolayer) | 3.5 | 0.066 |

With lower shipper duration, higher conductivity, and heavier weight, the monolayer material was found to be inferior to the bilayer insulation in this application; nevertheless, the monolayer material may be suitable for certain applications.

Example 7

The prototype shipper of Example 1, having a volume of about 1 cubic foot, consisted of about 480 grams of paper insulation, of which about 130 grams was tissue paper and 350 grams was Kraft paper. The present inventors believe that, if small rolls of tissue paper and Kraft paper are obtained from paper manufacturers, 100 such shippers could be made from 2-3 rolls of tissue paper and 3-4 rolls of Kraft paper. (Assumptions: tissue paper roll contains 3360 linear feet; Kraft paper roll contains 1000 linear feet.) Thus, having a table-top sized apparatus to wind insulation for shippers, and a storage space equivalent to a typical storage closet, would enable a small facility such as a high street pharmacy store to manufacture hundreds of shippers on demand. The same pharmacy would otherwise require a small warehouse to maintain an inventory of pre-assembled shippers. Other insulation materials, like EPS or extruded starch, do not readily offer themselves to this on-demand manufacturing model by virtue of their large-scale manufacturing requirements.

A paper prototype shipper, as described in Example 1 was obtained. Weights of side assembly and base/lid panels for a paper prototype shipper were measured. Then, the base/lid panel was taken apart so that the tissue and Kraft paper could be weighed separately. From this data, a ratio between tissue and Kraft paper weight was established. This was used to calculate the weight of the tissue paper and Kraft paper within the paper prototype shipper. See Table 5 below for results.

TABLE 5

| Shipper Part | Weight (g) | Tissue Weight (g) | Kraft Weight (g) |
|---|---|---|---|
| Base/Lid Panel (15 layers) | 65* | 17.5* | 47.5* |
| Side Assembly (10 layers) | 348* | 94 | 254 |
| Total | 479 | 130 | 349 |

*Indicates a measured value, while others were calculated from estimated ratios.

Standard rolls of tissue paper and Kraft paper were then evaluated. Table 6 below provides publicly available information relating to these values.

TABLE 6

| Parameter | Tissue Paper Roll | Kraft Paper Roll |
|---|---|---|
| Web Width (in) | 12 | 20 |
| Linear Feet (ft) | 3,360 | 1,000 |
| Square Feet (ft²) | 3,360 | 1,666 |
| Roll Weight (lbs) | 12.25 | 22 |
| Roll Weight (kg) | 5.55 | 9.98 |

* Values for Kraft are for the flat paper, before it is stretched.

Using the weight ratio measured from the paper prototype shipper, and the weights of material on the full rolls, we assumed the following: 1) a single tissue paper roll has enough material to produce 42 paper prototype shippers, and 2) a single Kraft paper roll has enough material to produce 28 paper prototype shippers.

Each paper prototype shipper, once made, had an approximate volume of 1 cubic foot. Using the Geami® WrapPak® HV converter as an equipment example, which is a tabletop unit taking up approximately 6 cubic feet of space (machine dimensions approximately 28 inch×20 inch×17 inch), we see that a relatively small piece of equipment can generate a large volume of shippers (28 shippers, 28 cubic feet) before raw materials are replaced.

In order to make the same volume of shippers using expanded polystyrene (EPS), significantly more square footage and volume is required. This is because the manufacturing process of EPS has multiple stages, requires specialized equipment, and is not readily converted to small-scale manufacturing.

Therefore, when limited floor space is a major constraint, in-house manufacture of paper shippers is significantly more attainable than manufacture of EPS shippers.

Example 8

The prototype shipper of Example 1 had a volume of approximately 1 cubic foot. Disassembly and flattening the structure by hand reduced the volume by about 25% to 0.73 cubic feet. Using mechanical compression of about 1 psi reduced the volume still further to about 0.55 cubic feet. This represents a 45% reduction between use volume and disposal volume. The disassembled and compressed insulation retained its cohesiveness (did not shed particulates, fibers, or otherwise break apart). By comparison, a molded EPS shipper (as described in Example 2) cannot easily be reduced for disposal, unless it is broken. This is undesirable due to EPS particle shedding.

A paper prototype shipper, as described in Example 1 was obtained. The shipper started with an approximate volume of 1 cubic foot, which we define as the use volume. For disposal simulation, the PCM and outer corrugate were separated from the bilayer material insulation. The side assembly, the base panel, and the lid panel remained. The side assembly was then collapsed. This was done by flattening the structure by hand, changing the dimensions from a 12 inch×12 inch×12 inch hollow structure to a 4 inch×21 inch×12 inch panel. The two top and bottom panels of dimensions 8 inch×8 inch×2 inch each were added to the total, which provided a new overall volume of 0.73 cubic feet. This reduced volume was defined as the disposal volume. Therefore, simple deconstruction of the shipper by hand can reduce the shipper volume by at least 25%. The disposal volume can be further reduced by compressing the panels.

In order to measure the compressibility of the insulation, a base panel similar to components in Example 1, but with dimensions 12 inch×12 inch×60 mm, was obtained. This base panel was placed between platens that applied a pressure of 0.972 psi, or 140 lbs over a square foot area. This is similar to a person weighing 140 lbs standing on the panel. The compressive force applied resulted in the panel thickness decreasing to 45.3 mm, which was approximately 75% of the original thickness. See Table 7 below for test results.

TABLE 7

| Sample | Thickness (No compression) | Thickness (0.972 psi) | Compression % |
|---|---|---|---|
| 14 layers expanded Kraft + tissue paper | ~60 mm (used ruler) | 45.3 mm | 75% |

Using this measurement, a panel thickness reduction of 25% was factored into the collapsed insulation dimensions. This resulted in the overall volume being reduced to 0.55 cubic feet, which was a 45% reduction between use volume and disposal volume. By comparison, the use volume of a molded EPS shipper (as described in Example 2) cannot be reduced for disposal, unless it is broken. This is undesirable due to EPS particle shedding.

Disposal is also made more convenient by reducing the cross-sectional area of the insulation for insertion into a standard disposal bin. The smallest cross-sectional area achievable for a molded EPS insulation base of 1 cubic foot is 10 inch×12 inch (120 in$^2$), assuming the lid of 2-inch thickness was removed. In contrast, the smallest cross-sectional area achievable for the paper prototype side assembly would be 3 inch×12 inch (48 in$^2$) for the same size shipper. This is a 60% reduction in cross-sectional area compared to the molded EPS incumbent.

Therefore, it has been demonstrated that the paper prototype shipper is more convenient to dispose of than a standard molded EPS shipper of the same size.

Example 9

Thermal conductivity is the rate of heat flow under steady conditions through a unit area, per unit temperature gradient, in the direction perpendicular to the unit area.

$$k = q\frac{L}{\Delta T}$$

where
k=thermal conductivity (W/m·K)
L=thickness of the sample (m)
T=temperature (K)
q=heat flow rate or heat flux (W/m$^2$)

Because thermal conductivity is normalized per unit area and per unit thickness, k is a property of the material, and is independent of thickness unless the material is non-homogeneous. Heat flux, however, is normalized per unit area but not per unit thickness and is therefore dependent upon sample thickness. When studying composite materials, it can be useful to test both thermal conductivity and heat flux.

It has been found that the measured thermal conductivity of layered insulation materials, like bubble wrap, the above-described bilayer material, and sheets of expanded polystyrene (EPS), increase as more layers are added. This is a departure from traditional, solid insulation materials, which do not see a change in thermal conductivity as thickness increases. Therefore, for shippers that are designed to use layered insulation, it is important to gauge how the thermal properties change as layers are added.

In order to numerically gauge this change in thermal properties, the thermal conductivity of various insulation materials at a variety of layer amounts was measured. The thermal conductivity change as a function of thickness, over 3 layers, was then calculated. See Tables 8 and 9 below for a summary of these results. Note that the bilayer paper insulation in these tables was RANPAK READY ROLL® wrapping and packaging paper.

Thermal Conductivity vs. Number of Layers for Various Insulation Materials

TABLE 8

| Material | Number of Layers | Thickness (mm) | Thermal Conductivity (W/mK) |
|---|---|---|---|
| Bilayer paper insulation | 1 | 5 | 0.04430 |
| Bilayer paper insulation | 2 | 10 | 0.04830 |
| Bilayer paper insulation | 3 | 15 | 0.05000 |
| Bilayer paper insulation | 4 | 20 | 0.05097 |
| Bilayer paper insulation | 5 | 25 | 0.05159 |
| Bilayer paper insulation | 6 | 30 | 0.05217 |
| Bilayer paper insulation | 10 | 50 | 0.05374 |
| Bubble wrap (⅜ inch diameter) | 1 | 2.5 | 0.03284 |
| Bubble wrap (⅜ inch diameter) | 2 | 5 | 0.04106 |
| Bubble wrap (⅜ inch diameter) | 3 | 7.5 | 0.04672 |
| Bubble wrap (⅜ inch diameter) | 4 | 10 | 0.05099 |
| Bubble wrap (⅜ inch diameter) | 5 | 12.5 | 0.05454 |
| Bubble wrap (⅜ inch diameter) | 6 | 15 | 0.05707 |
| Bubble wrap (1¼ inch diameter) | 1 | 11 | 0.07200 |
| Bubble wrap (1¼ inch diameter) | 2 | 22 | 0.09675 |
| Bubble wrap (1¼ inch diameter) | 3 | 33 | 0.11810 |
| Bubble wrap (1¼ inch diameter) | 4 | 44 | 0.13550 |
| EPS - 3 lb/ft$^3$ Density | 1 | 23.8 | 0.03298 |
| EPS - 3 lb/ft$^3$ Density | 2 | 48.8 | 0.03375 |
| EPS - 3 lb/ft$^3$ Density | 3 | 73.8 | 0.03407 |
| EPS - 1 lb/ft$^3$ Density | 1 | 23.5 | 0.03940 |
| EPS - 1 lb/ft$^3$ Density | 2 | 47.3 | 0.04124 |
| EPS - 1 lb/ft$^3$ Density | 3 | 70.9 | 0.04222 |

TABLE 9

| Material | Conductivity Change Over 3 Layers, per Thickness (W/mK per mm) |
|---|---|
| Bilayer paper insulation | 0.00057 |
| Bubble wrap (⅜ inch diameter) | 0.00278 |
| Bubble wrap (1¼ inch diameter) | 0.00210 |
| EPS - 3 lb/ft$^3$ Density | 0.00002 |
| EPS - 1 lb/ft$^3$ Density | 0.00006 |

Ideally, insulation for the layered application would have the lowest thermal conductivity and low to no conductivity change as successive layers are added. As can be seen in Tables 8 and 9 above, the two different grades of EPS have low thermal conductivity and almost no change with layering, so EPS might appear to be the best choice. However, EPS is not flexible, and cannot be wrapped around the support structure without breaking, so it would not work in this application. Bubble wrap, on the other hand, is well known for its ability to wrap around objects to provide physical and thermal protection, so it could be used in application. However, as layers were added to both grades of bubble wrap tested, the thermal conductivity increased dramatically, with the overall result being a poor insulation material by the time the desired thicknesses of 20 mm, 50 mm, or more was reached. Therefore, it is not the preferred choice. The bilayer paper insulation provided an excellent compromise across these three requirements: flexible enough to wrap easily, relatively low thermal conductivity, and low rate of conductivity change as a function of thickness and number of layers (especially when compared to bubble wrap).

From a more practical point of view, a preferred embodiment of the invention would provide the best insulative properties with the least number of layers and the thinnest overall material. When compared to the two grades of bubble wrap in FIGS. 16 through 19, it can be seen again that the bilayer insulation material provided the best thermal properties for a given overall thickness and for a given number of layers, especially once there are more than 2 layers (or 10 mm overall thickness).

Figure 16:
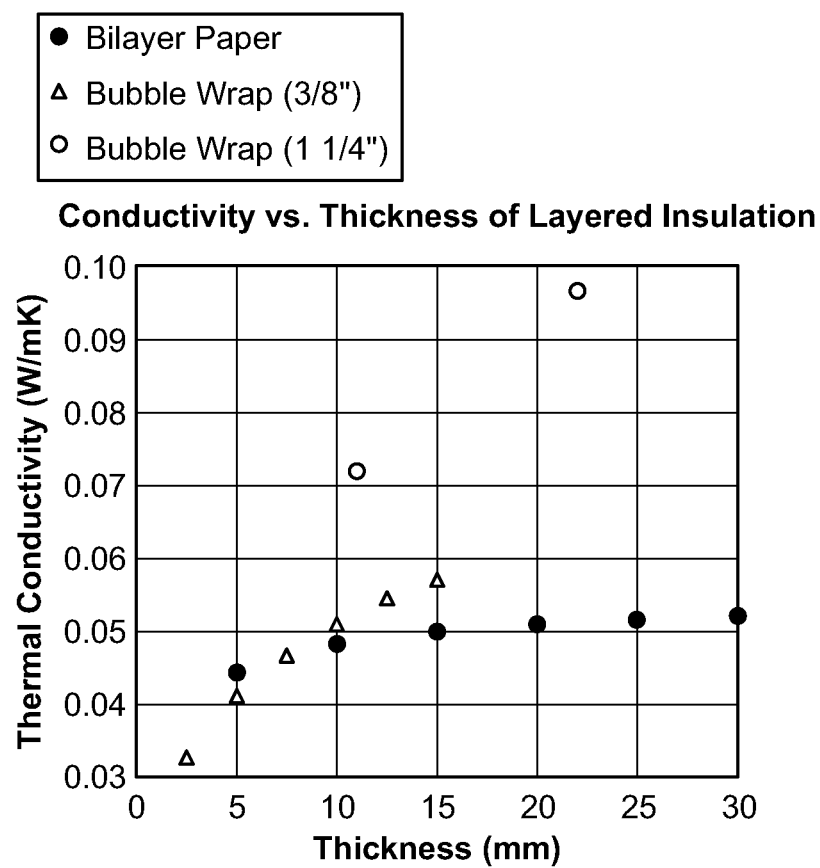
FIG. 16 is a graph depicting the thermal conductivity, as a function of thickness, for the bilayer material shown in FIG. 2C and for two different thicknesses of bubble wrap.

More specifically, as can be seen in FIG. 16, bilayer paper insulation provided the lowest overall thermal conductivity values at and above 10 mm overall layered thickness when compared to both grades of bubble wrap.

Figure 17:
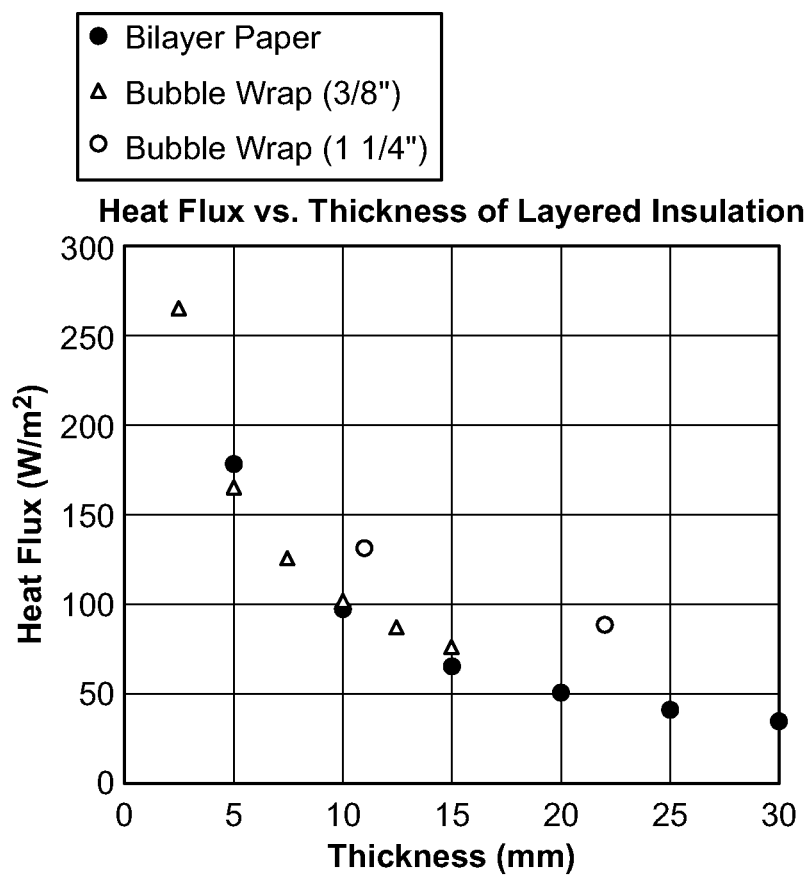
FIG. 17 is a graph depicting the heat flux, as a function of thickness, for the bilayer material shown in FIG. 2C and for two different thicknesses of bubble wrap.

As can be seen in FIG. 17, bilayer paper insulation provided the lowest heat flux value at and above 10 mm overall layered thickness when compared to both grades of bubble wrap.

Figure 18:
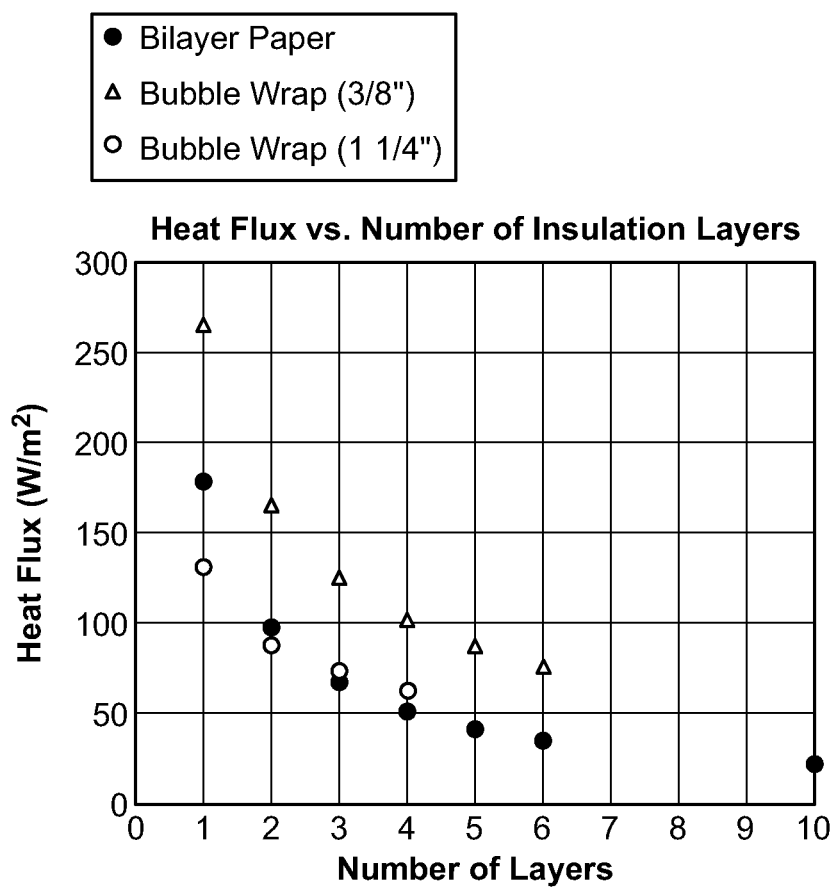
FIG. 18 is a graph depicting the heat flux, as a function of the number of layers, for the bilayer material shown in FIG. 2C and for two different thicknesses of bubble wrap.

As can be seen in FIG. 18, bilayer paper insulation provided the lowest heat flux value at and above 3 layers of material when compared to both grades of bubble wrap.

Figure 19:
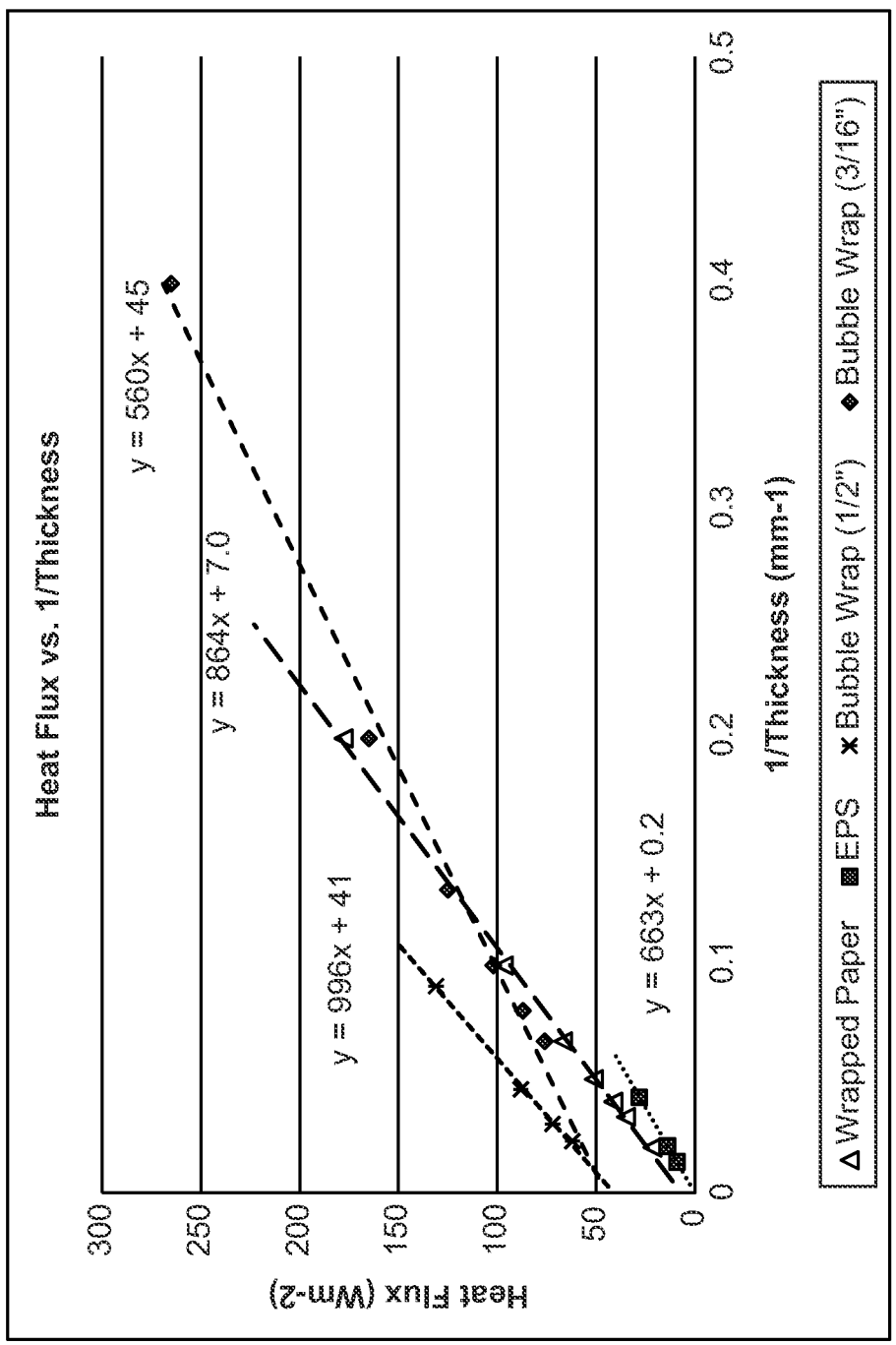
FIG. 19 is a graph depicting heat flux vs. inverse thickness for the bilayer material shown in FIG. 2C, for two different thicknesses of bubble wrap, and for expanded polystyrene.

FIG. 19 plots the thermal conductivity data in terms of heat flux (q/A) vs. inverse thickness (1/L), wherein A is the area of the material in $m^2$. If we write out the equation this represents, we should get $q/A = k\Delta T (1/L)$. If thermal conductivity, k, is only dependent on the terms in this equation, then the relationship should be linear, with an intercept at 0. This makes sense as an infinitely thick material ($1/\infty = 0$) should allow zero heat through it (q/A=0).

As can be seen in the fit equations applied to the data in FIG. 19, this is true for a traditional material like EPS, but not for the layered materials. This means that an extra, unknown factor is increasing thermal conductivity, which detracts from the performance of the material as insulation. This unknown factor may be regarded as "layer factor" and is equal to the y-intercept for the fit equations in FIG. 19. The layer factor is small (i.e., 7) for the wrapped bilayer paper when compared to bubble wrap (41 in the case of ½ inch bubble wrap and 45 in the case of 3/16 inch bubble wrap), meaning that the wrapped bilayer paper behaves closer to traditional insulation (layer factor of about 0), which makes the wrapped bilayer paper better than bubble wrap for this type of application.

The embodiments of the present invention described herein are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system for storing and/or transporting temperature-sensitive materials, the system comprising:
    (a) an outer container, the outer container comprising a cavity;
    (b) an insulation unit disposed in the cavity of the outer container, wherein the insulation unit comprises (i) a support, the support defining a space, the space being dimensioned to receive a payload and a passive temperature-control member, and (ii) thermal insulation wrapped around the support in a wrap direction, wherein the thermal insulation is wrapped continuously around the support at least three times to form a plurality of spiral wraps, wherein each spiral wrap is adhered with an adhesive to an adjacent spiral wrap, the thermal insulation comprising an expanded slit-sheet packaging material; and
    (c) at least one passive temperature-control member positioned in the space.

2. The system as claimed in claim 1 wherein the thermal insulation has a layer factor of no more than 7.

3. The system as claimed in claim 1 wherein the thermal insulation comprises a bilayer material, the bilayer material comprising a first sheet that is textured, the first sheet being the expanded slit-sheet packaging material, and a second sheet that is non-textured.

4. The system as claimed in claim 3 wherein the first sheet comprises an expanded sheet of honeycombed Kraft paper and wherein the second sheet comprises tissue paper.

5. The system as claimed in claim 4 wherein the thermal insulation has a thickness of at least 1 inch.

6. The system as claimed in claim 5 wherein the thermal insulation has a thickness of about 2-4 inches.

7. The system as claimed in claim 1 wherein the insulation unit, as a whole, is reversibly transformable between an expanded configuration and a flattened configuration by applying compressive force to the insulation unit at different locations thereof to effect transformation.

8. The system as claimed in claim 1 wherein the outer container and the insulation unit are reversibly transformable together between an expanded configuration and a flattened configuration by applying compressive force to the outer container at different locations thereof to effect transformation.

9. The system as claimed in claim 1 wherein the support and the thermal insulation are made of paper-based materials, whereby the insulation unit is recyclable without requiring disassembly.

10. The system as claimed in claim 1 wherein the at least one passive temperature-control member comprises a saddlebag, wherein the saddlebag is arranged to define a cavity dimensioned to receive the payload, and wherein the thermal insulation is wrapped around the saddlebag.

11. The system as claimed in claim 10 wherein the saddlebag is reversibly transformable between an expanded configuration and a collapsed configuration.

12. The system as claimed in claim 1 further comprising at least one of a top insulation member positioned above the payload and a bottom insulation member positioned below the payload and wherein at least one of the top insulation member and the bottom insulation member comprises a bilayer material wrapped around itself, wherein the bilayer material comprises a first sheet and a second sheet, the first sheet comprising an expanded slit-sheet packaging material, the second sheet comprising tissue paper.

13. The system as claimed in claim 1 wherein the outer container comprises an envelope.

14. The system as claimed in claim 13 wherein the thermal insulation is adhered to an interior of the envelope.

15. An insulation unit for use in a system for storing and/or transporting temperature-sensitive materials, the insulation unit comprising:
(a) a support, the support defining a cavity dimensioned to receive a payload; and
(b) thermal insulation wrapped around the support in a wrap direction, wherein the thermal insulation is wrapped continuously around the support at least three times to form a plurality of spiral wraps, wherein each spiral wrap is adhered with an adhesive to an adjacent spiral wrap, and wherein the thermal insulation comprises a sheet of an expanded slit-sheet packaging material.

16. The insulation unit as claimed in claim 15 wherein the support is a sleeve comprising open top and bottom ends.

17. The insulation unit as claimed in claim 15 wherein the support is a 5-sided box comprising four sides, a bottom, and an open top.

18. The insulation unit as claimed in claim 15 wherein the support is a 6-sided box comprising four sides, a bottom, and a top.

19. The insulation unit as claimed in claim 15 wherein the thermal insulation has a thickness of at least 1 inch.

20. The insulation unit as claimed in claim 15 wherein the support and the thermal insulation together are reversibly transformable between an expanded configuration and a flattened configuration by applying compressive force to the insulation unit at different locations thereof to effect transformation.

21. The insulation unit as claimed in claim 15 wherein the support and the thermal insulation are made of paper-based materials, whereby the insulation unit is recyclable without requiring disassembly.

22. The insulation unit as claimed in claim 15 wherein the thermal insulation comprises a bilayer material, wherein the bilayer material comprises a first sheet and a second sheet, the first sheet being the expanded slit-sheet packaging material, the second sheet being a sheet of tissue paper.

23. The system as claimed in claim 1 wherein the expanded slit-sheet packaging material is wrapped seamlessly around the support.

24. The insulation unit as claimed in claim 15 wherein the thermal insulation is wrapped seamlessly around the support.

25. The system as claimed in claim 1 wherein the outer container comprises a cardboard box.

26. The insulation unit as claimed in claim 15 wherein the support comprises a material selected from the group consisting of cardboard and chipboard.

27. The system as claimed in claim 1 wherein the expanded slit-sheet packaging material creates a three-dimensional structure that enables air flow through the three-dimensional structure in a variety of directions.

28. The insulation unit as claimed in claim 15 wherein the expanded slit-sheet packaging material creates a three-dimensional structure that enables air flow through the three-dimensional structure in a variety of directions.

29. The insulation unit as claimed in claim 1 wherein each of the outer container and the insulation unit is made of at least one of cardboard and paper.

30. The system as claimed in claim 1 wherein the support is a sleeve having open top and bottom ends and is made of a material selected from the group consisting of cardboard and chipboard.

31. The system as claimed in claim 1 wherein the adhesive is parallel to the wrap direction in a continuous stream.

* * * * *